US009311067B2

(12) United States Patent
Connors

(10) Patent No.: US 9,311,067 B2
(45) Date of Patent: Apr. 12, 2016

(54) CONTENT CHANGEABLE SMART PHONE APPLICATION FOR NAVIGABLE VENUES AND MULTI-PARTY NAVIGATIONAL SYSTEM

(75) Inventor: Robert W. Connors, Lake Barrington, IL (US)

(73) Assignee: Robert W. Connors, Lake Barrington, IL (US)

( * ) Notice: Subject to any disclaimer, the term of this patent is extended or adjusted under 35 U.S.C. 154(b) by 240 days.

(21) Appl. No.: 13/566,596

(22) Filed: Aug. 3, 2012

(65) Prior Publication Data
US 2013/0035856 A1 Feb. 7, 2013

Related U.S. Application Data

(60) Provisional application No. 61/515,154, filed on Aug. 4, 2011.

(51) Int. Cl.
*G01C 21/00* (2006.01)
*G06F 9/44* (2006.01)
*G06F 9/445* (2006.01)

(52) U.S. Cl.
CPC ....................................... *G06F 8/60* (2013.01)

(58) Field of Classification Search
CPC ............................... G06F 8/60; G06F 17/3087
USPC ......... 701/484, 433, 408, 420, 454, 461, 482, 701/409, 300, 485, 487, 465, 1, 33.2, 517, 701/467, 118; 717/173, 151; 455/456.3, 455/419, 414, 408, 456.2, 558, 575.9, 3.06, 455/403, 575, 500, 456
See application file for complete search history.

(56) References Cited

U.S. PATENT DOCUMENTS

| | | | | |
|---|---|---|---|---|
| 5,661,652 A * | 8/1997 | Sprague et al. | ............ | 455/456.2 |
| 5,677,837 A * | 10/1997 | Reynolds | ................... | 455/456.3 |
| 5,724,243 A * | 3/1998 | Westerlage et al. | ........ | 455/456.5 |
| 5,724,660 A * | 3/1998 | Kauser et al. | ............... | 455/456.2 |
| 5,726,893 A * | 3/1998 | Schuchman et al. | ........ | 455/456.3 |
| 5,729,457 A * | 3/1998 | Seymour | ................... | 455/456.5 |
| 5,732,354 A * | 3/1998 | MacDonald | ............... | 455/456.2 |
| 5,732,383 A * | 3/1998 | Foladare et al. | ........... | 455/456.5 |

(Continued)

OTHER PUBLICATIONS

International Search Report of the International Searching Authority issued for PCT/US2012/049591, mailed Feb. 21, 2013. 5 pages.

(Continued)

*Primary Examiner* — Marthe Marc-Coleman
(74) *Attorney, Agent, or Firm* — K&L Gates LLP

(57) ABSTRACT

A content changeable system for navigable venues includes (i) a software application folder for storage at a software application storage area, the software application folder including a plurality of software applications, each software application individually downloadable to a user's communication and data transfer device ("cdd"), each software application corresponding to a venue that can be physically navigated by the user, each application including at least one changeable content corresponding to a content station of the venue; and (ii) at least one server computer server configured to (a) upload the software applications to the software application storage area; and (b) receive information from at least one of the venues indicating that a particular changeable content corresponding to a particular content station of the at least one venue needs to be changed.

22 Claims, 13 Drawing Sheets

(56) References Cited

U.S. PATENT DOCUMENTS

| | | | |
|---|---|---|---|
| 5,745,867 A * | 4/1998 | Mills | 455/456.3 |
| 5,758,300 A * | 5/1998 | Abe | 455/424 |
| 5,790,973 A * | 8/1998 | Blaker et al. | 455/456.5 |
| 5,790,974 A * | 8/1998 | Tognazzini | 455/456.5 |
| 5,802,492 A * | 9/1998 | DeLorme et al. | 455/456.5 |
| 5,884,221 A * | 3/1999 | Wortham | 701/300 |
| 5,895,431 A * | 4/1999 | Miller et al. | 701/1 |
| 6,122,520 A * | 9/2000 | Want et al. | 455/456.2 |
| 6,161,018 A * | 12/2000 | Reed et al. | 455/456.1 |
| 6,191,708 B1 * | 2/2001 | Davidson | 701/465 |
| 6,212,393 B1 * | 4/2001 | Suarez et al. | 455/456.4 |
| 6,243,648 B1 * | 6/2001 | Kilfeather et al. | 701/485 |
| 6,282,417 B1 * | 8/2001 | Ward | 455/431 |
| 6,292,743 B1 * | 9/2001 | Pu et al. | 701/423 |
| 6,292,747 B1 * | 9/2001 | Amro et al. | 701/487 |
| 6,405,175 B1 * | 6/2002 | Ng | 705/14.26 |
| 6,446,004 B1 * | 9/2002 | Cao et al. | 701/482 |
| 6,473,692 B2 * | 10/2002 | Hancock et al. | 701/409 |
| 6,536,037 B1 * | 3/2003 | Guheen et al. | 717/151 |
| 6,542,813 B1 * | 4/2003 | Kovacs | 701/484 |
| 6,553,313 B1 * | 4/2003 | Froeberg | 701/484 |
| 6,823,260 B1 * | 11/2004 | Turcotte | 701/484 |
| 6,937,998 B1 * | 8/2005 | Swartz et al. | 705/27.1 |
| 7,058,508 B2 * | 6/2006 | Combs et al. | 701/484 |
| 7,072,672 B1 * | 7/2006 | Vanska et al. | 455/456.3 |
| 7,130,622 B2 * | 10/2006 | Vanska et al. | 455/419 |
| 7,224,959 B2 * | 5/2007 | Kraft et al. | 455/407 |
| 7,264,157 B2 * | 9/2007 | Ishizuka | 235/383 |
| 7,272,494 B2 * | 9/2007 | Murray et al. | 701/484 |
| 7,463,980 B2 * | 12/2008 | Hoiness et al. | 701/484 |
| 7,487,042 B2 * | 2/2009 | Odamura | 701/420 |
| 7,778,774 B2 * | 8/2010 | Li et al. | 701/484 |
| 7,894,771 B2 * | 2/2011 | Son et al. | 455/41.3 |
| 8,224,355 B2 * | 7/2012 | Beydler et al. | 455/457 |
| 8,494,765 B2 * | 7/2013 | Konet et al. | 701/433 |
| 8,532,705 B2 * | 9/2013 | Quetglas et al. | 455/558 |
| 8,538,458 B2 * | 9/2013 | Haney | 455/456.2 |
| 8,594,933 B2 * | 11/2013 | Neugebauer et al. | 701/484 |
| 8,725,175 B2 * | 5/2014 | Altman et al. | 455/456.3 |
| 2002/0095323 A1 * | 7/2002 | Combs et al. | 705/8 |
| 2002/0122055 A1 * | 9/2002 | Parupudi et al. | 345/737 |
| 2002/0164973 A1 * | 11/2002 | Janik et al. | 455/403 |
| 2003/0220737 A1 * | 11/2003 | Smith et al. | 701/213 |
| 2004/0162673 A1 * | 8/2004 | Murray et al. | 701/210 |
| 2005/0197963 A1 * | 9/2005 | Raley et al. | 705/54 |
| 2005/0222767 A1 * | 10/2005 | Odamura | 701/213 |
| 2006/0058948 A1 * | 3/2006 | Blass et al. | 701/207 |
| 2007/0005243 A1 * | 1/2007 | Horvitz et al. | 701/213 |
| 2007/0032225 A1 * | 2/2007 | Konicek et al. | 455/417 |
| 2007/0150191 A1 * | 6/2007 | Li et al. | 701/213 |
| 2007/0178830 A1 * | 8/2007 | Janik et al. | 455/3.06 |
| 2008/0046170 A1 * | 2/2008 | DeGrazia | 701/202 |
| 2008/0174831 A1 * | 7/2008 | Dugas | 358/473 |
| 2009/0265251 A1 * | 10/2009 | Dunlap et al. | 705/26 |
| 2011/0040625 A1 * | 2/2011 | Woodruff et al. | 705/14.58 |
| 2011/0117978 A1 * | 5/2011 | Janik et al. | 455/575.9 |
| 2011/0129199 A1 * | 6/2011 | Del Sordo et al. | 386/241 |
| 2012/0173141 A1 * | 7/2012 | Scales | 701/484 |
| 2012/0323488 A1 * | 12/2012 | Callaghan | 701/454 |
| 2013/0035856 A1 * | 2/2013 | Connors | 701/484 |
| 2013/0297203 A1 * | 11/2013 | Kelly | 701/454 |

OTHER PUBLICATIONS

Written Opinion of the International Searching Authority issued for PCT/US2012/049591, mailed Feb. 21, 2013. 7 pages.
Written Opinion of the International Preliminary Examining Authority issued for PCT/US2012/049591, mailed Sep. 9, 2013. 6 pages.

* cited by examiner

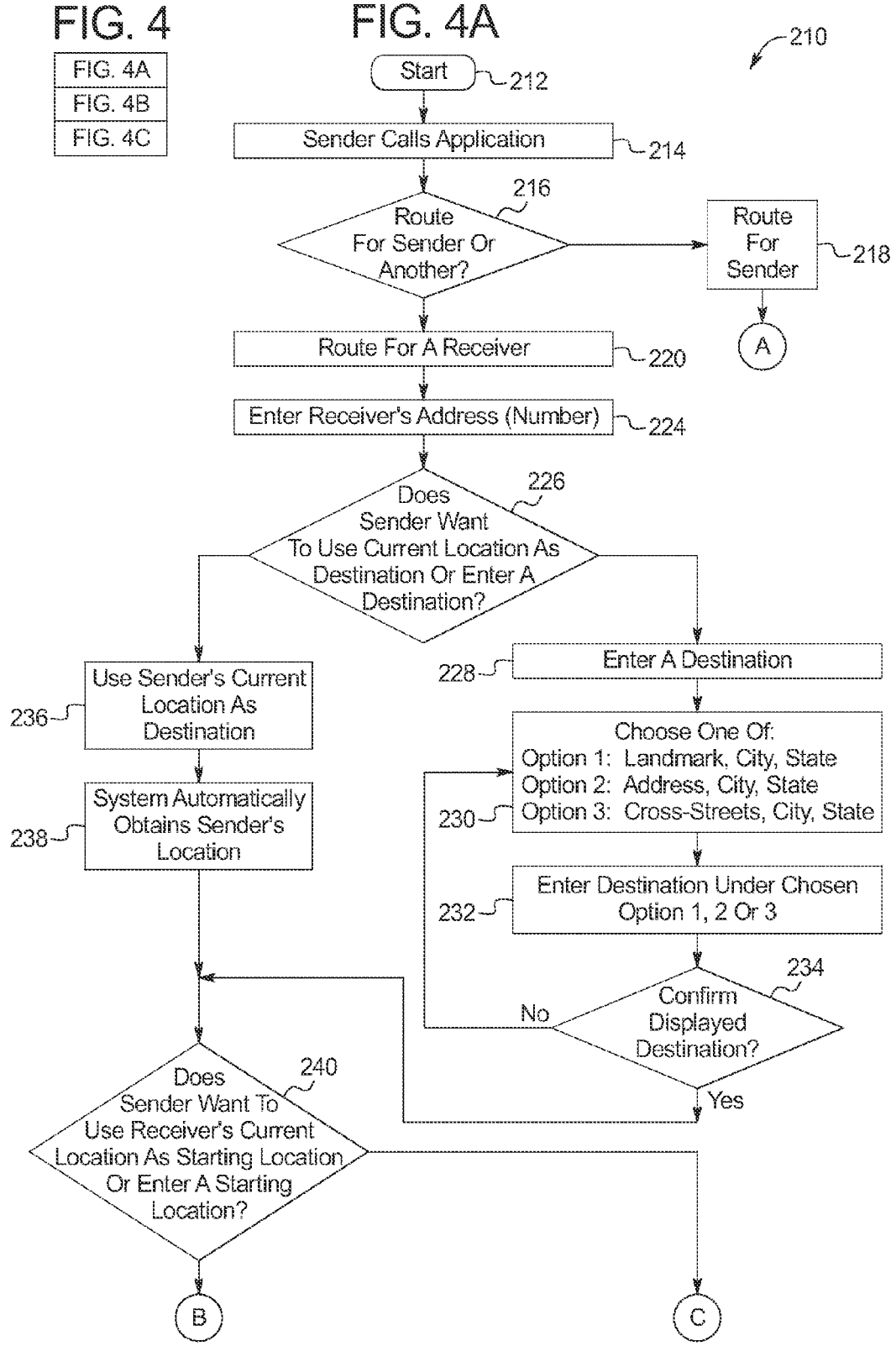

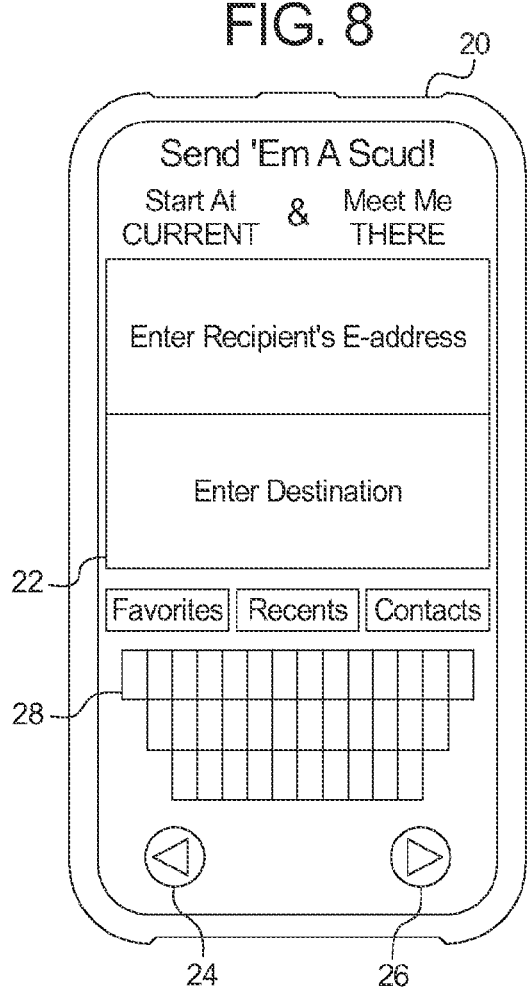
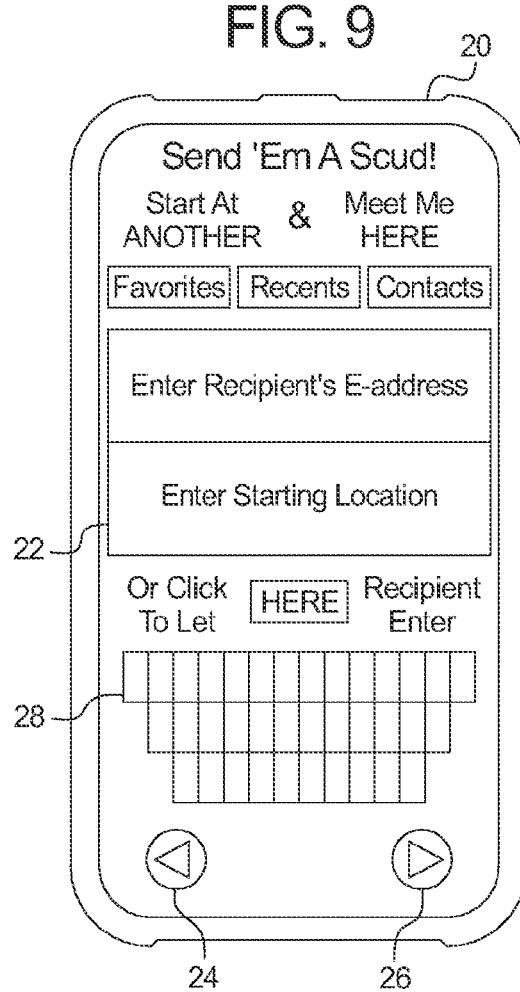

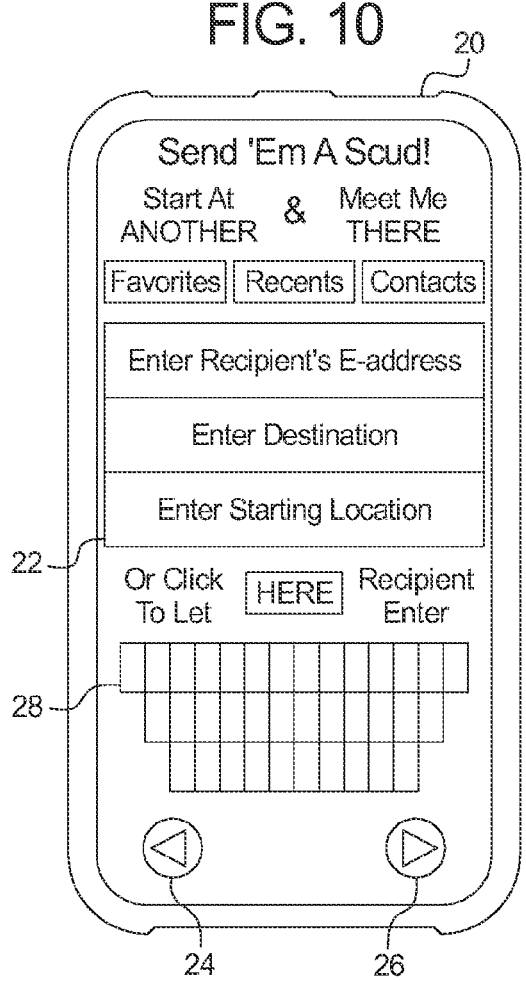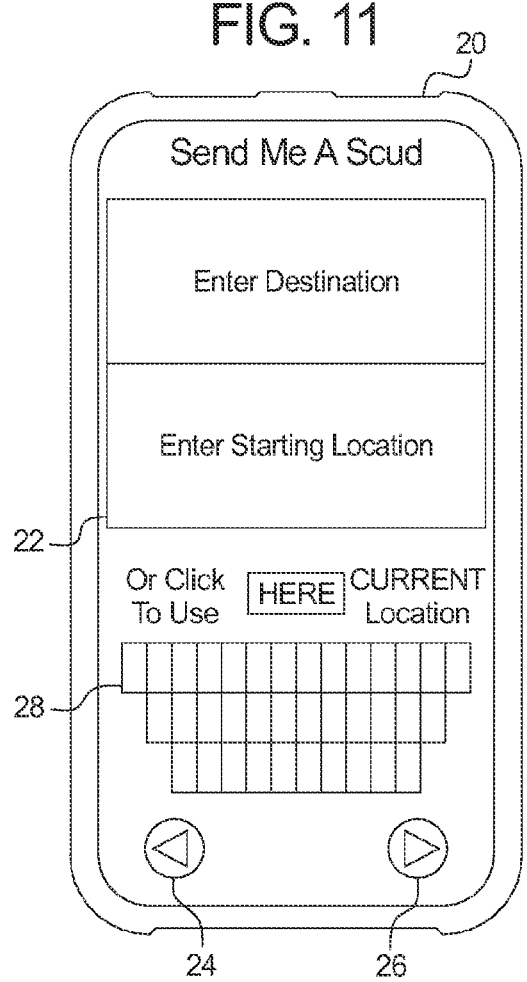

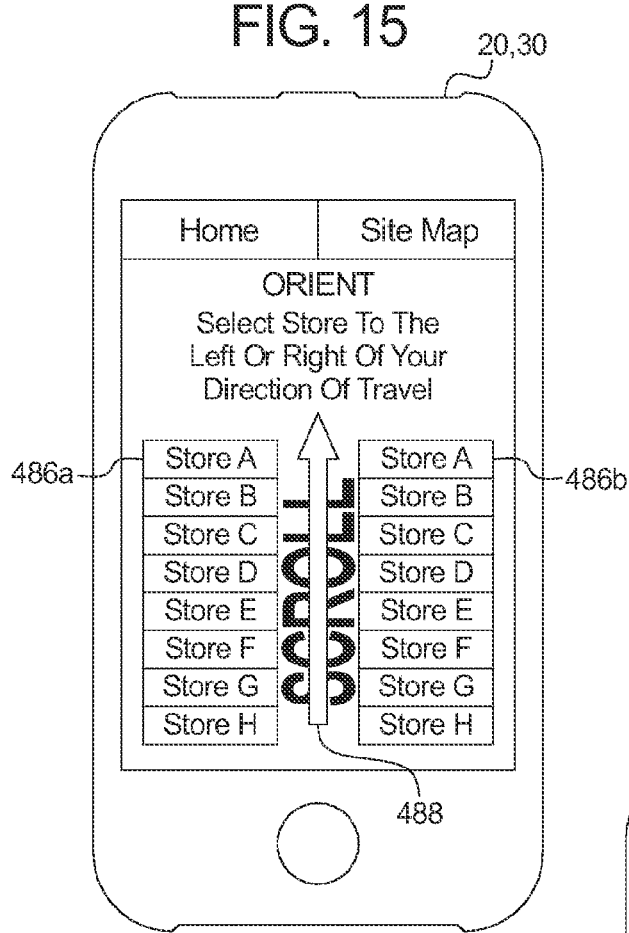
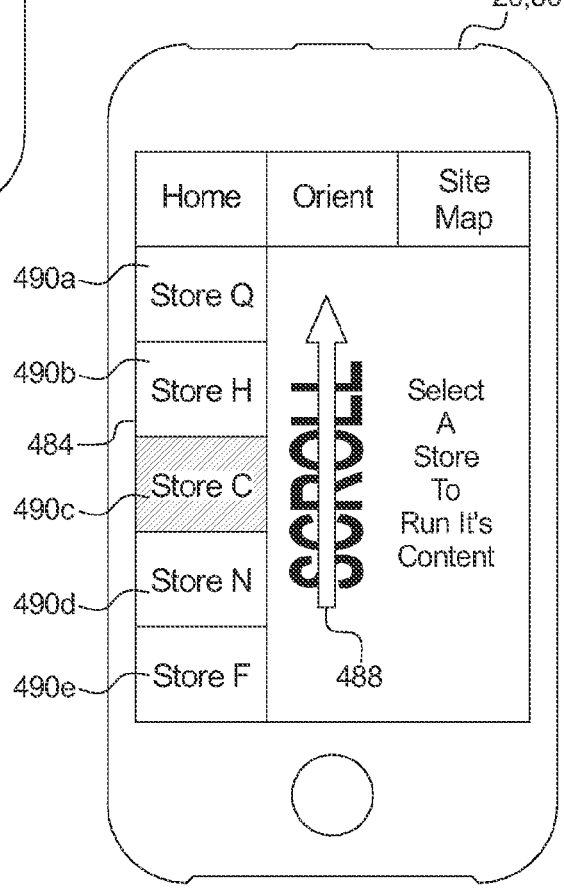

CONTENT CHANGEABLE SMART PHONE APPLICATION FOR NAVIGABLE VENUES AND MULTI-PARTY NAVIGATIONAL SYSTEM

PRIORITY CLAIM

This application claims priority to and the benefit of U.S. Patent Application No. 61/515,154, filed Aug. 4, 2011, the entire contents of which are expressly incorporated herein by reference and relied upon.

BACKGROUND

The present disclosure relates to navigational software systems.

Navigational software systems exist today. For example, automobiles have navigational systems that show the driver's current position and can also provide a map to a known destination.

Known navigational systems have a number of drawbacks. First, the systems can be expensive, especially if they are not used often. Second, the systems are limited to a single user.

Improved navigational systems and methods are needed accordingly.

SUMMARY

The present disclosure sets forth a multi-party navigational software system. The software can be programmed using any software language and platform used for today's navigational systems. The output of the software system can be displayed or played on a computer screen or on a video monitor provided in an automobile. In one particularly useful example, the output is displayed or played on a user's smart phone or other type of smart communicator having access to an internet. While the present application primarily discusses use with a smart phone, it is also contemplated to display or play the output of the software on the user's personal computer. For ease of illustration and explanation, the use of the term smart phone refers to any device in communication with a satellite and/or an internet.

In an embodiment, the software resides in a server computer located at a provider's facility, described herein as the "application". The application software contains the ability to create a map or route from a starting location to an ending location. As discussed in detail below, it is contemplated to receive the starting location and the ending location in a plurality of different ways. In any case, once the route is determined, it is sent to a receiving party. In an embodiment, the map or route is sent as an electronic mail or multimedia messaging service ("MMS") message to the receiving party. For example, the application can send a satellite message from an application tower to a smart phone tower that is dedicated to or communicates with the recipient's smart phone. The recipient's smart phone tower relays the route to the user's smart phone. The recipient receives a "text message" including the route. Upon opening the message, the route is displayed, e.g., graphically, textually, audibly or some combination thereof.

Alternatively, the route is sent via the application and smart phone towers as described above, but here instead as an application to the recipient's smart phone. If the recipient is receiving the application for the first time, or if the recipient has previously deleted the software, or if the software is configured to uninstall itself after a predetermined period, the application installs software onto the recipient's smart phone. The route opens under the installed software, which operates with the global positioning system ("GPS") of the recipient's smart phone to track the position of the smart phone and update the recipient's position along the route as the recipient follows the route.

If the recipient already has the application software installed on the recipient's smart phone, the route opens up under the installed software, which operates with the GPS of the recipient's smart phone to track the position of the smart phone and to update the receiver's position along the route as the recipient follows the route.

Once the receiver reaches the final destination of the route, it is contemplated that the route time out, be uninstalled or otherwise not be displayed or accessed. Underlying software for displaying the route may remain on the receiver's smart phone and be accessible by an icon displayed on the smart phone. In this manner, the receiver can in the future call upon the software for initiating the generation of a route as a sender. The software remaining on the user's smart phone can be permanently installed, e.g., removable only by the receiver, or itself time out or uninstall itself after a certain period, e.g., a period of non-use of the application. In a further alternative embodiment, the underlying software times-out or uninstalls itself along with the route.

Still further alternatively, the route may remain on the receiver's smart phone permanently or for a period of time. For example, the route may be provided with a "reverse route" option to help the receiver find his/her way back home. Here, the route can time out or be uninstalled when the GPS senses that the receiver has returned to the initial starting location. It is a goal of the present system not to clutter the user's smart phone with old routes if they are not needed. However, it may be found that the receiving parties want to keep some or all of the routes for later use. Thus it may be desirable to allow the user to selectively delete the routes instead.

In one primary embodiment of the present disclosure, a sender sends directions to a receiver. Here, there is a sending party and a different receiving party, each with a smart phone (or personal computer). The sender sends the receiver directions. Another primary embodiment of the present discloser can loosely be called the "I need directions" embodiment. Here, the sender and the receiver are the same person. The sender initiates a request to the application, which sends the route to the sender/receiver.

In one implementation of the two-party primary embodiment, the system automatically detects the sender's (and possibly the receiver's location). This implementation can be loosely termed the "meet me here" implementation. In this implementation, the sender initiates the route generation by sending an electronic communication to the application along with the receiver's electronic address (E-address). The receiver's E-address can for example be the receiver's cellular phone number or the receiver's electronic mail (email address). The application automatically detects the sender's current location, e.g., via communication with sender's cellular service, which knows the position of sender's smart phone via the service's GPS. The application initiates communication with the receiver for example via an electronic mail, text or MMS message. In one embodiment, once the receiver receives or opens the initiation communication, the application automatically detects the receiver's current location, e.g., via a GPS location communication from the receiver's cellular tower to the application's cellular tower. If there is no way for the application to determine the receiver's location, the receiver can instead send the receiver's location to the application.

The application now knows the sender's and the receiver's location. The application determines a route from the receiver's location to the sender's location and sends the route to the receiver via electronic mail, text or MMS message. The receiver opens the route and is graphically, textually, and/or audibly guided to the sender's location. Discussed herein are various ways to charge a fee for the route generation. All of the options discussed herein for timing out the route and/or application software, storing the route, and providing a return route to the receiver are applicable to this "meet me here" implementation.

In another implementation of the two-party primary embodiment, the sender inputs a desired meeting location. This implementation can be loosely termed the "meet me there" implementation. In this second implementation, the sender initiates the route generation by sending an electronic communication to the application along with the desired meeting location and the receiver's E-address. The receiver's E-address can again be the receiver's cellular phone number or the receiver's electronic mail (email address). Described below are different ways in which it is contemplated to input the desired meeting location, including entering a name or landmark, entering a street address, or entering cross-streets. The application initiates communication with the receiver for example via an electronic mail, text or MMS message. In one embodiment, once the receiver receives or opens the initiation communication, the application automatically detects the receiver's current location, e.g., via a GPS location communication from the receiver's cellular tower to the application's cellular tower. If there is no way for the application to determine the receiver's location, the receiver can send the receiver's location to the application.

The application now knows the desired meeting location and the receiver's location. The application determines a route from the receiver's location to the desired meeting location and sends the route to the receiver via electronic mail, text or MMS message. The receiver opens the route and is graphically, textually, and/or audibly guided to the sender's location. A fee can again be charged as described below. All of the options discussed herein for timing out the route and/or application software, storing the route, and providing a return route to the receiver are applicable to this "meet me there" implementation.

In a third implementation of the two-party primary embodiment, the sender inputs the receiver's location as the starting location and uses the sender's GPS location as the final route destination. In this implementation of the "meet me here" route generation, connection with the receiver is not required to obtain the information needed to generate a route. In this third implementation, the sender initiates the route generation by sending an electronic communication to the application along with (i) the receiver's E-address and (ii) the receiver's location. The application automatically detects the sender's current location, e.g., via a GPS location communication from the sender's cellular tower to the application's cellular tower. The application now knows the sender's location and the receiver's location. The application generates a route from the receiver's location to the sender's location and sends the route to the receiver via electronic mail, text or MMS message. The receiver opens the route and is graphically, textually, and/or audibly guided to the sender's or desired location. A fee for the route can be charged as discussed below. All of the options discussed herein for timing out the route and/or application software, storing the route, and providing a return route to the receiver are applicable to this third implementation.

In a fourth implementation of the two-party primary embodiment, the sender inputs the sender's location (or a desired location) and receiver's location. In this implementation of the "meet me there" route variety, neither (i) connection with the receiver nor (ii) any type of sender or receiver location detection is required to obtain the information needed to generate a route. In this fourth implementation, the sender initiates the route generation by sending an electronic communication to the application along with (i) the receiver's E-address, (ii) the receiver's location and (iii) the sender's location or a desired location. The application now knows the desired meeting location and the receiver's location. The application generates a route from the receiver's location to the sender's location or the desired meeting location and sends the route to the receiver via electronic mail, text or MMS message. The receiver opens the route and is graphically, textually, and/or audibly guided to the sender's current or desired location. A fee for the route can be charged as discussed below. All of the options discussed herein for timing out the route and/or application software, storing the route, and providing a return route to the receiver are applicable to this fourth implementation.

In one implementation of the single-party "I need directions" primary embodiment, the system automatically detects the sender's location. In this implementation, the sender initiates the route generation by sending an electronic communication to the application along with a desired location. Described below are different ways in which it is contemplated to input the desired location, including entering a name or landmark, entering a street address, and entering cross-streets. The application now knows the sender's location and the sender's desired destination location. The application determines a route from the sender's current location to the sender's desired destination location and sends the route to the sender/receiver via electronic mail, text or MMS message. The sender/receiver opens the route and is graphically, textually, and/or audibly guided to the sender's or desired location. A fee for the route can be charged as discussed below. All of the options discussed herein for timing out the route and/or application software, storing the route, and providing a return route to the sender/receiver are applicable to this implementation.

In another implementation of the single-party "I need directions" primary embodiment, the sender instead enters a desired starting location (which may be the same or different than the sender's current location). Here, sender location detection is not required to obtain the information needed to generate a route. In this implementation, the sender initiates the route generation by sending an electronic communication to the application along with (i) a current or desired starting location and (ii) a desired location. The sender can again input the desired location by entering a name or landmark, entering a street address, and entering cross-streets. The application knows the sender's starting location and the sender's desired destination location. The application generates a route from the sender's desired starting location to the sender's desired destination location and sends the route to the sender/receiver via electronic mail, text or MMS message. The sender/receiver opens the route and is graphically, textually, and/or audibly guided to the sender's or desired location. A fee for the route can be charged as discussed below. All of the options discussed herein for timing out the route and/or application software, storing the route, and providing a return route to the sender/receiver are applicable to this implementation.

As mentioned above, the route may be communicated graphically, textually or audibly. When communicated audibly, it is contemplated to provide a "hit me" button that allows the user to selectively decide when to receive a current location update. It is believed that it will be comforting to the user to know that he/she can receive an update whenever desired. It is also contemplated to not let the sender see a map of the receiver's location, for safety purposes, unless the receiver agrees. If the receiver agrees, the location of both the sender and the receiver can be shown on a multi-party graphical route map. It is further contemplated to provide a parental option that automatically allows the "parent" sender to see the map and the "child" recipient's location on the map.

The maps described above can span, cities, states and even countries. However, it is further contemplated to provide local application area ("laa") maps. Laa maps can be provided for public or private entities, such as parks, zoos, theme parks, shopping malls, department stores, and the like. The laa maps, like the larger area maps, can be shared maps that allow multiple users to find individual locations within the maps and to find each other. The laa maps, like the larger area maps, can also be searchable to find desired locations along the route, for example. The laa maps are described in detail below.

In yet another primary aspect of the present disclosure, various embodiments for a content changeable smart phone system for navigable venues are described. Such System allows a person entering a navigable venue to select an application specific to that venue. The venue could example be a museum, zoo or shopping mall. The person upon entering the museum for example is notified that the museum application exists. The person can then choose to download the museum application to the person's smart phone.

Once downloaded, the museum application provides the user in essence user with an informational tour of the museum. The application can have audio, video or audiovisual content. The system also maps the venue, e.g., the museum. In an embodiment, delivery of the application content, e.g., audio content, is user selectable. That is, the ser can approach and view any exhibit within the museum that the user wishes. The user then finds an icon for that exhibit on the map of the museum. The user can zoom into and out of the map to easily find the desired exhibit icon. Once the user selects the icon, the content for that exhibit is played. The content can include words and/or music that provide or correspond to an environment, mood or genre of the particular exhibit. The content can help to explain not only what the exhibit is or entails but also its significance, e.g., with respect to or in conjunction with, other exhibits in the museum. In other examples below, zoo venues and shopping mall venues are discussed.

It is accordingly an advantage of the present disclosure to provide a navigational system that the user can call upon when needed.

It is another advantage of the present disclosure to provide a navigational system that does not need to be purchased upfront.

It is a further advantage of the present disclosure to provide a navigational system that does not require the user to know a starting address.

It is still a further advantage of the present disclosure to provide a navigational system that does not require the user to know a finishing address.

It is yet another advantage of the present disclosure to provide a navigational system that does not require the user to know a starting or a finishing address.

Further still, it is an advantage of the present disclosure to provide a navigational system that may be used by two or more people trying to meet on another.

It is yet a further advantage of the present disclosure to provide a route having a selectable "hit me" or location update button, such that the user can receive current route status when desired.

Still further, an advantage of the present disclosure is to provide to provide safety features, such that a person's current location cannot be learned by another without the person's consent.

Yet another advantage of the present disclosure to provide navigational systems and methods having a "parent" mode in which a parent can locate a child via a route from the child to the parent.

Moreover, an advantage of the present disclosure is to provide route and mapping generation for a local area application ("laa").

Still a further advantage of the present disclosure to provide shared routes and mapping for both wider areas and local application areas.

In still another advantage of the present disclosure, navigational systems and methods provide wider area or local application area mapping and route generation that are searchable to achieve a desired destination and/or to see desired locations along a route.

Still another advantage of the present disclosure to provide a content changeable smart phone system for navigable venues.

Additional features and advantages are described herein, and will be apparent from the following Detailed Description and the figures.

BRIEF DESCRIPTION OF THE FIGURES

FIG. 8 is an elevation view of one embodiment of a "meet me there" screen displayed on a user's cdd.

FIG. 9 is an elevation view of another embodiment of a "meet me here" screen displayed on a user's cdd.

FIG. 10 is an elevation view of another embodiment of a "meet me there" screen displayed on a user's cdd.

FIG. 11 is an elevation view of one embodiment of an "I need directions" screen displayed on a user's cdd.

FIG. 15 is an elevation view of one embodiment of a map orientation screen displayed on a user's cdd for the system of FIG. 12.

FIG. 16 is an elevation view of one embodiment of a content selection screen displayed on a user's cdd for the system of FIG. 12

DETAILED DESCRIPTION

System Architectures

Figure 1:
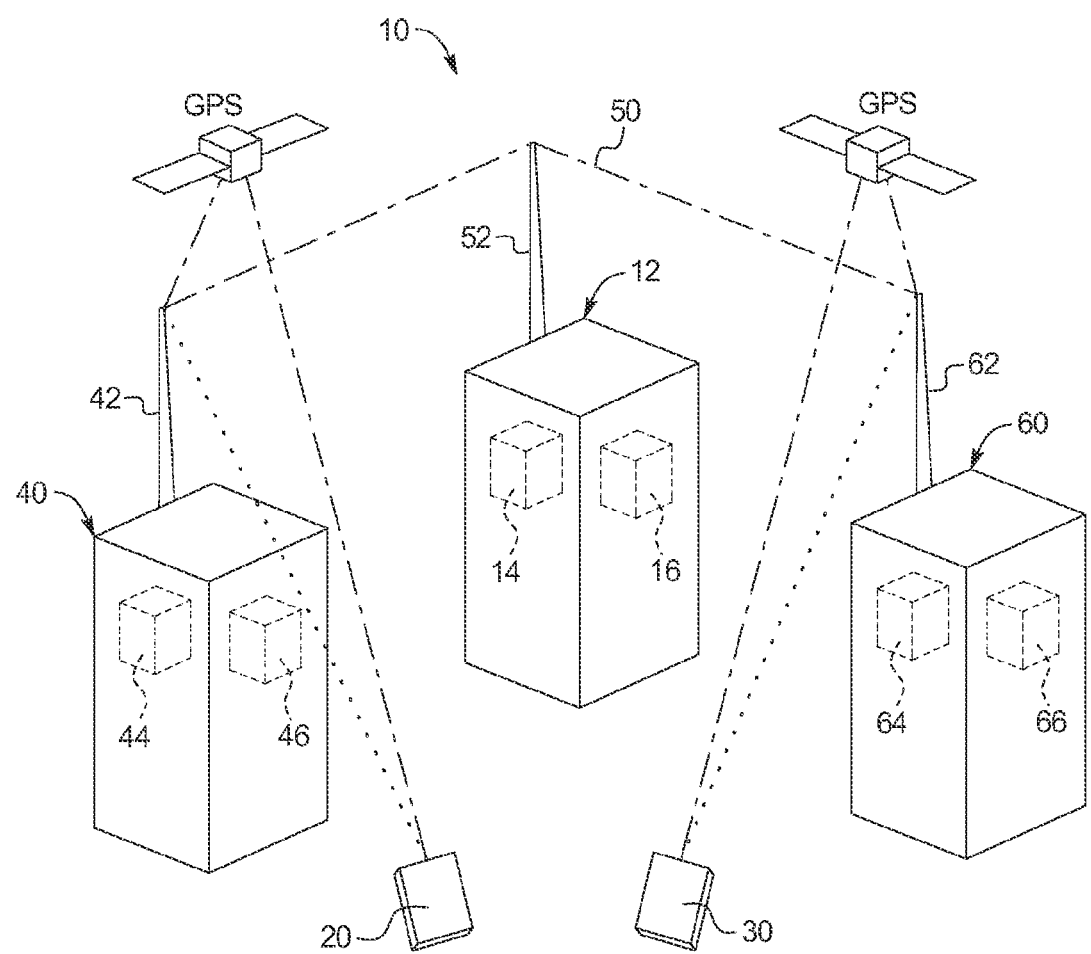
FIG. 1 is a schematic perspective view of one embodiment of a system of the present disclosure using a wide area network for sending a multi-party route from a sender to a receiver.

Referring now to the drawings and in particular to FIG. 1, system 10 illustrates one embodiment of a communications and data storage configuration configured to send a multi-party route from a sender to a receiver. System 10 includes an application server 12. Application server 12 includes at least one processor 14 and memory 16 for holding, knowing the location of, and accessing the maps, addresses, street crossings and landmarks that can be entered by the sender and/or receiver into the application software. Processing 14, memory 16 and associated software also store and access the software capable of generating the routes and maps for the application once the starting location and ending location are entered into or determined by system 10. Processing 14, memory 16 and associated software also store the searchable information that may be useful to and accessible by a user along a generated map or route and/or to find a destination for the route.

System 10 in one embodiment communicates via a wider area network 50. Network 50 can communicate via wired or cable connection, wireless connection, or some combination thereof; e.g., wireless to a local cellular tower, and then via cable to the sender's or the receiver's computer. Communication protocols suitable for use with network 50 of system 10 can be a long range protocols, such as (i) the "worldwide interoperability for microwave access" ("WiMAX") protocol, which allows the sender's or receiver's smart phone to access an interne; and (ii) the "global system for mobile communications" ("GSM") protocol, which is a widespread long-range wireless protocol enabling data communication to the many of the world's cellular telephones.

Network 50 can alternatively or additionally employ a medium range protocol, such as a wireless local area network ("WLAN"), which can be a protocol that is part of the Institute of Electrical & Electronics Engineers ("IEEE") 802.11 standard, such as (i) IEEE 802.11a, (ii) IEEE 802.11b, (iii) WEE 802.11g, or (iv) 802.11n. While much of the present application involves routes that can span across different cities, states and countries, it is expressly contemplated herein to implement system 10 and associated network on a smaller or localized scale, such as for amusement parks, zoos, shopping malls or any place large enough in which a person can get lost or want to know quickly and precisely how to get from a current location to a desired location and/or to have someone meet the person at that location.

The protocols above can produce and communicate via at least one of electronic mail or a multimedia messaging service ("MMS") message. In the illustrated embodiment, application server 12 accesses or is in communication with network 50 via a cellular phone tower 52 of a type known to those of skill in the art and capable of communication and data transfer via at least one of the protocols described herein. Cellular phone tower 52 can be a single tower or a plurality of towers dedicated to the application server. Indeed, it is contemplated that application server 12 itself be of a hub and spoke variety, for example, wherein each spoke of the server is dedicated to a spoke tower.

Figure 2:
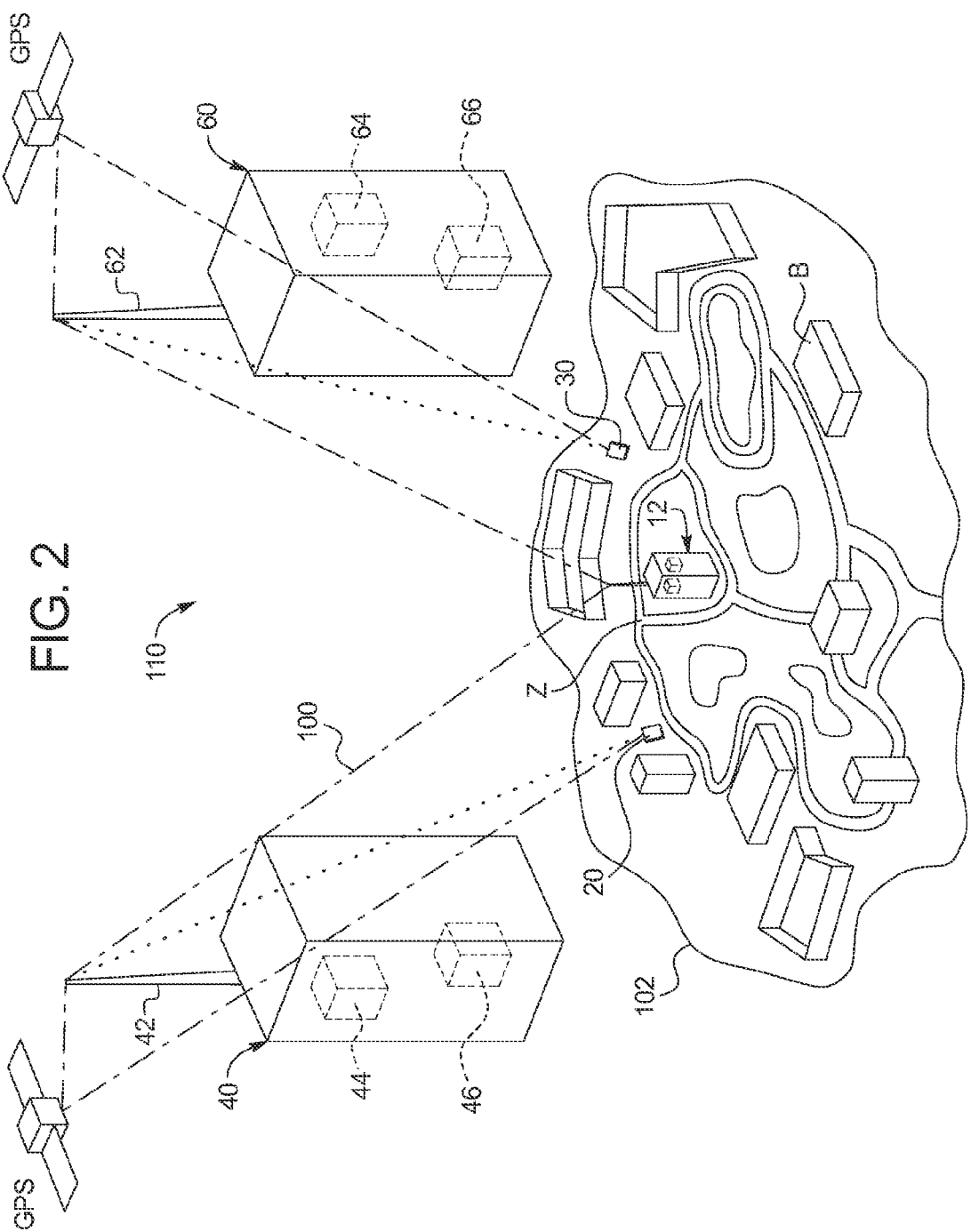
FIG. 2 is a schematic perspective view of one embodiment of a system of the present disclosure using a localized application server for sending a multi-party route from a sender to a receiver for a local application area ("laa").
Figure 3:
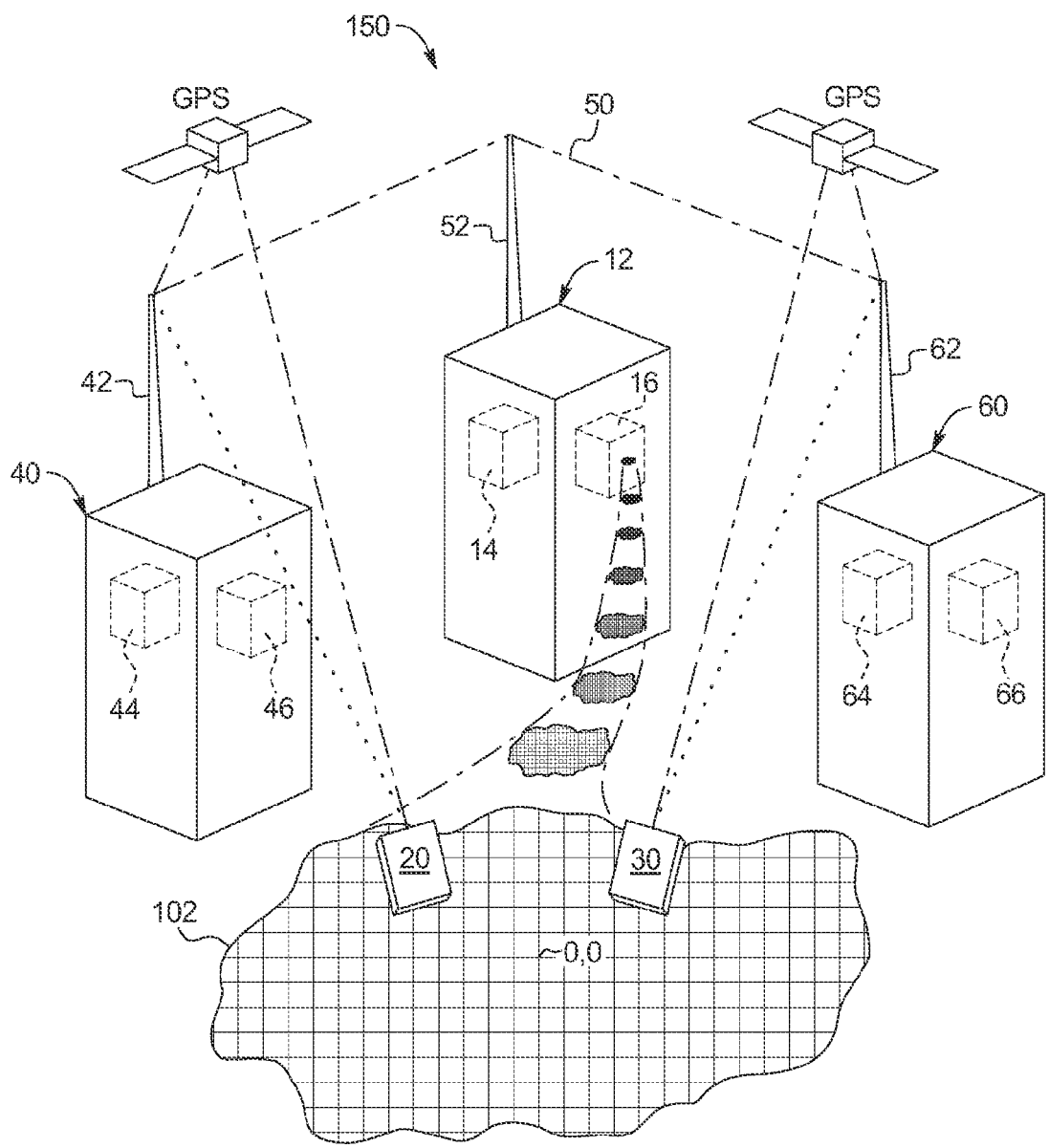
FIG. 3 is a schematic perspective view of one embodiment of a system of the present disclosure using a remote application server for sending a multi-party route from a sender to a receiver for an laa.

While the global positioning satellites ("GPS's") are illustrated as being dedicated to the cellular providers 40 and 60, it is expressly contemplated for a GPS to be dedicated alternatively or additionally to the application entity associated with application server 12. Further alternatively, cellular providers, such as providers 40 and 60, may not use GPS's at all. Instead, the providers may triangulate between multiple ones of its towers to pinpoint the location of the user's personal communication and data transfer device ("cdd"), e.g., smart phone. For example, cellular provider 40 may have or use multiple, e.g., three or more, towers 42 that each perform a send and receive (ping) with cdd 20. Based on the response time back to each tower 42 via the ping, cellular provider 40 can calculate where cdd 20 resides within the geographical boundary outlined by the towers. As the user moves, cdd 20 passes from one set of towers 42 to another set of towers 42. That second set of towers now calculates the location of cdd 20 within its geographical boundary. Here, no satellite is needed. Thus while FIGS. 1 to 3 each show GPS's used with cellular providers 40 and 60, either one or both of cellular providers 40 (via processing 44 and memory 46) and 60 (via processing 64 and memory 66) in any one, or more, or all of systems 10, 110 and 150, and for any of the applications described below, may alternatively use the multi-tower calculator ("MTC") and associated method of detecting the location of cdd 20 and/or cdd 30. This is illustrated in FIGS. 1 to 3 by the alternative dotted line extending from cdd 20 and cdd 30 to the respective towers 42 or 62. In actuality, there would be multiple dotted lines pinging back and forth between cdd 20 and multiple towers 42 and multiple dotted lines pinging back and forth between cdd 30 and multiple towers 62.

Still further alternatively, it is expressly contemplated that both the sender and receiver use the same cellular provider 40 or 60. Systems 10, 110 and 150 each show cdd 20 using provider 40 and cdd 30 using provider 60. It should be appreciated however, that in any one or more or all of systems 10, 110 and 150, and for any of the applications discussed below, both cdd 20 and cdd 30 could use single provider 40 or that both cdd 20 and cdd 30 could use single provider 60. In such cases, application server 12 communicates back and forth in the sender/receiver fashion described herein with cellular phone tower 42 or back and forth in the sender/receiver fashion described herein with cellular phone tower 62.

As discussed, the cellular service for the sender and the receiver also likely employ many cellular phone towers. For ease of illustration however, system 10 is illustrated having a single application server tower 52, a single cellular service tower 42 and GPS for the sender, and a single cellular service tower 62 and GPS or MTC for the receiver. The sender's cellular service tower 42 can communicate and be operated by one or more server computer 40, having one or more processing 44 and memory 46. At least one processing 44 and memory 46 perform the operations necessary to operate sender's cdd 20. Server 40 operating with wireless or cellular tower 42 and associated GPS or MTC receives communications and data from, and transfers communications and data to, sender's cdd 20.

Likewise, the receiver's cellular service tower 62 can communicate and be operated by one or more server computer 60, having one or more processing 64 and memory 66. At least one processing 64 and memory 66 for perform the operations necessary to operate the receiver's personal communication and data transfer device cdd 30. Server 60 operating with wireless or cellular tower 66 and associated GPS or MTC receives communications and data from, and transfers communications and data to, receiver's cdd 30.

The cellular service for the sender and the receiver can be the same service or be different services, including but not limited to Alltel™, AT&T™, Cellular One™, Nextel™, Sprint™, T Mobile™, US Cellular™, Verison™, specialty carriers and prepaid only carriers. The sender's cdd 20 can be any commercially available smart phone, for example, using any of the cellular services describe above. Likewise, the receiver's cdd 30 can be any commercially available smart phone, for example, using any of the cellular services describe above. As shown below, in certain applications only the sender's cdd 20 is necessary. In other applications of the present disclosure, receiver's cdd 30 is also used.

It is contemplated that network 50 of FIG. 1 can span the range provided by the cellular services for sender's cdd 20 and receiver's cdd 30. That is, wherever sender's cdd 20 can send a phone call, text or email, sender's cdd 20 and sender's server 40 can initiate a route to be generated at application server 12. And wherever receiver's cdd 30 can receive a phone call, text or email, receiver's server 60 can receive a route from application server 12 and relay the route to receiver's cdd 30. It should be appreciated that the extensive coverage provided by many cellular phone services today makes the application reach of system 10 include addresses, roads, cross-streets, buildings and landmarks that stretch cross-country and even internationally.

Referring now to FIG. 2, system 110 illustrates an alternative system in which the same basic equipment is used but with a cellular or wireless network 100 that is more local than with system 10 of FIG. 1. That is, system 110 still employs application server 12, including processing 14, memory 16 and associated software, operable with application server tower 52. System 110 still employs sender's server 40, including processing 44 and memory 46, operable with sender's cellular service tower 42. System 110 still employs receiver's server 60, including processing 64 and memory 66, operable with receiver's cellular service tower 62. With system 110, however, application server 12 is placed in a local application area ("laa") 102 for the specific purpose of providing a mapping and routing feature for laa 102.

Laa 102 can be any type of publicly or privately held location that is large enough and/or houses enough different sub-entities to warrant local electronic mapping for the purpose of generating routes from one location (not a current cdd location) to another or from a current cdd location to another location. Laa 102 can for example be an amusement park, public park, museum, library, zoo, shopping mall, department store, and the like. Laa 102 is mapped in software, which is stored for example at memory 16 of application server 12. The route or map can be a visual route or map, such as a visual route guiding movement for example (i) from one ride or current location to another ride at an amusement park, (ii) from one animal house or current location to another animal house at a zoo, or (iii) from one store or a current location at a shopping mall to another store.

The laa map is in one embodiment a searchable informational map. For example, a library map can direct the user to a particular section of library reference numbers in response to a query specifying an author or book title. Or, a shopping mall or department store map can direct the user to a particular store or department in response to a query requesting a particular brand, product or item on sale. The searched information can be provided with a visual route, for example, leading to the area of the library having the reference numbers, the store or the department.

System 110 also helps people locate each other at laa 102. At any time, the sender can initiate a route to be generated between cdd 20 and cdd 30, which guides the sender and receiver together. The software stored on memory 16 can be configured to project a meeting point between the sender and receiver if desired and guide the two parties towards the meeting point along the route.

In system 110, application server 12 is located on or near the grounds of laa 102. In such a configuration, memory 16 can be programmed such that server 12 or its transmission/receive tower 52 is set as coordinate 0, 0. Laa 102 is then mapped in software based on coordinates relative to 0, 0 in units that are discernable to the GPS or MTC of the cellular services for sender cdd 20 and receiver cdd 30. For example, sender cdd 20 and receiver cdd 30 may be tracked to within a one meter radius. So in FIG. 2, if the sender's current position is one-hundred meters west of server 12 and twenty-five meters north of server 12, sender's transmission/receive tower 42 would send sender's position to server 12, which the software in processing 14 and memory 16 would convert, if mapped in meters, to the position −100, +25, for example. Processing 14, memory 16 and associated software would also coordinate the spot −100, +25 to a physical location of laa 102, e.g., on a walkway alongside amusement ride or animal house "X". Likewise, if the receiver's current position is ninety meters east of server 12 and thirty-five meters north of server 12, receiver's transmission/receive tower 62 would send sender's position to server 12, which the software in memory 16 would convert, if mapped in meters, to the position +90, +35, for example. Processing 14, memory 16 and associated software would also coordinate the spot +90, +35 to a physical location of laa 102, e.g., on a walkway alongside amusement ride or animal house "Y".

Having both the sender's position and the receiver's position, processing 14, memory 16 and associated software can generate a route or routes between the two positions. Processing 14, memory 16 and associated software can also calculate a likely meeting point along the map (e.g., assuming sender and receiver walk at the same rate), which can be communicated to the sender and receiver as an actual, identifiable location at laa 102, e.g., in front of amusement ride animal house "Z" illustrated in FIG. 2. Server 12 via transmission/receive tower 52 sends the route(s) to both sender's server 40 via transmission/receive tower 42 and receiver's server 60 via transmission/receive tower 62, which in turn download the route(s) to the sender's cdd 20 and receiver's cdd 30, respectively. As the sender and receiver move towards each other, icons on the routing maps representing the sender and the receiver are shown moving towards each other. That is, the above mapping process is repeated at a workable frequency, e.g., every second or five seconds, in which (i) cdd positions are obtained via GPS or MTC, (ii) are sent to server 12, (iii) mapped and converted to physical locations at laa 102, (iv) sent back from server 12 to sender server 40 and receiver server 60, which (v) send updated coordinates to cdd's 20 and 30, respectively, allowing the application software on each cdd to move the icons appropriately. If either the sender or receiver is moving faster or slower than expected, the likely meeting point can be recalculated and re-communicated to the sender and receiver. The icon location updating just described is also applicable to the wider area system 10 of FIG. 1 and alternative laa system 150 of FIG. 3.

The above example is for the sender and the receiver walking to meet one another. Alternatively or additionally, the sender sends a route to the receiver for the receiver to follow to meet the sender at the sender's location. The above mapping process is performed in the same manner using the coordinate system discussed. Sender's position is again mapped to be −100, +25, in the example. Receiver's position is again mapped to be +90, +35, in the example. The route between the two would be the same. But processing 14, memory 16 and associated software would assume sender's location to remain fixed (and thus be the assumed meeting location), while receiver's location and icon along the map would be shown moving from the receiver's location to the sender's location. In this example, the route need only be sent to the receiver's cdd 30. However, it is also contemplated to allow the route to be sent to the sender, so that the sender can view the receiver's progress. Thus, it is contemplated to provide an option in any of the embodiments and systems described herein for the receiver to allow or not allow the sender to view the receiver's progress along the route. Stated more generally, it is contemplated for all of the embodiments and systems described herein to provide safeguards against letting someone's location be known to another if it is not desired.

It should be appreciated that system 110 does not require there to be a sender and a receiver. That is, a user could simply request a route from a current location to a different location, e.g., ride, store, animal house or event, of laa 102. Using the above example, sender is currently at position −100, +25. Sender tells system 110 that sender would like a route from sender's current location to amusement ride or animal house "B" illustrated in FIG. 2. The coordinates of "B" are stored in memory to be for example +160, −100. System 110 can then determine the route knowing the starting location (−100, +25) and the desired ending location (+160, −100). Processing 14, memory 16 and associated software send the route via server 50 and transmission/receive tower 52 to sender's server 40, which in turn relays the route via its transmission/receive tower 42 to sender's cdd 20.

It is also expressly contemplated for system 110 and any other system described herein concerning a local application area, such as laa 102, to highlight spots along the route providing food, drink, bathrooms, etc. The highlighted spots can be shown regardless of whether the user asks to see the spots. For example, the routes can show circles or shapes having a letter(s) inside, such as "F" for food or "RR" for restrooms. It is contemplated to allow the user to press the touch screen shapes, after which a pop-up box appears providing information on the selected indicium, e.g., restaurant name, type of food, restroom facilities such as changing table, etc. The box can appear for a number of seconds and then disappear.

In another embodiment, the user is given an option to view desired spots along the route. For example the route can be shown adjacent to a selection box area. The selection box area can provide selectable and/or searchable indicia, such as "See Eateries", "See Restrooms", "See Attractions". The indicia can be touch screen indicia for cdd's providing touch screen capability. For cdd's not having touch screen capability, the selectable indicia can alternatively say "Press "E" for Eateries", "Press "RR" for Restrooms", or "Press "A" for Attractions" along the route. The user then presses the cdd's dedicated hard key "E", "RR" or "A" as desired.

Certain local application areas may have elevation changes, such as shopping malls or department stores having more than one floor. To handle this situation, it is contemplated in one embodiment for system 110 (and any other system described herein concerning a local application area, such as laa 102) to enquire as to which floor the sender and/or receiver currently resides. In a single user instance, e.g., when a sender requests a route from a current location to a different location, server 12 first sends a request through sender's server 40 via transmission/receive tower 42 to sender's cdd 20 to enter the sender's current floor. The sender's current floor is then transmitted back through sender's server 40 via transmission/receive tower 42 to server 12 via transmission/receive tower 52 along with the sender's GPS or MTC coordinates. Processing 14, memory 16 and associated software of server 12 can now map the sender's X, Y coordinates (relative to a 0, 0 sever 12/antenna 52 location as described above) to a particular floor or Z location. The route can then be provided as a three dimensional route. For example, a route that takes the sender from the first floor to the second floor guides the sender to an elevator, escalator or stairs and ends temporarily with a button that says something to the effect of "Press HERE When Reach Second Floor", e.g., for a touch screen cdd 20 or for a hard key cdd 20, "Press [2] When Reach Second Floor". When the appropriate touch screen key or hard key is pressed, a signal is sent from cdd 20 through sender's server 40 via transmission/receive tower 42 to server 12 via transmission/receive tower 52 along with the sender's GPS or MTC coordinates. Processing 14, memory 16 and associated software of server 12 now map the sender's X, Y coordinates (relative to a 0, 0 sever 12/antenna 52 location as described above) to a particular location on the second floor and resume the route from the second floor elevator, escalator or stairs to the desired location, e.g., to a particular store of the shopping mall. The 0, 0 sever 12/antenna 52 location is taken as a line that extends up from the first floor, though the second floor, and so on until extending through the top of the three dimensional local application area.

Referring now to FIG. 3, system 150 is employed for a local application area project, such as for laa 102, but instead uses wider area network 50 illustrated and described in connection with system 10 of FIG. 1. In system 150, application server 12 is not located within laa 102 as is the case with system 110 of FIG. 2. Server 12 is located remotely from laa 102 as are sender's server 40 and receiver's server 60.

Laa 102 is mapped into memory 16 of server 12. The map divides laa 102 into a grid, e.g., into increments discernable by the GPS's or MTC's of the services of sender's cdd 20 and receiver's cdd 30, e.g., into increments of meters. A central X, Y crossing can be set arbitrarily as 0, 0, as shown in FIG. 3. One grid to the east is 1, 0, one grid to the north is 0, 1, one grid to the west is −1, 0, and one grid to the south is 0, −1. Each of the mapped X, Y coordinates of laa 102 is then correlated with a GPS or MTC coordinate. It may be that sender's cdd service and receiver's cdd service have different GPS or MTC coordinates for the same physical location on earth. If so, memory 16 stores a table relating each particular coordinate for laa 102, e.g., 44, −44 (forty-four meters east and forty-four meters south of the zero, zero coordinate for laa 102) with a first GPS or MTC coordinate for sender's cdd service and a second GPS or MTC coordinate for receiver's cdd service. The table can relate, for each laa 102 coordinate, a GPS or MTC coordinate for any of the above listed cellular services, assuming they all have different GPS or MTC systems. System 150, and any of the systems herein, is simplified to the extent that GPS or MTC coordinate systems of different cellular services have been standardized.

With laa 102 mapped into memory 16 of remote server 12, processing 14, memory 16 and associated software can perform any of the functions described above in connection with system 110. The location of sender's cdd 20 and receiver's cdd 30 can be related to any of the grids of the virtual map of laa 102. Thus any of the (i) "single user", (ii) "sender and receiver find each other", or (iii) "receiver finds sender" functions described above for system 110 can be performed equally adeptly by system 150. Eateries, bathrooms, attractions along the route can likewise be highlighted according to any of the alternative embodiments discussed for system 110. System 150 can also generate multi-floor or z-dimensional routes, just as with system 110.

With either system 110 and 150 it is also contemplated to allow the user to display a map of all of the local application area, such as laa 102, or only part of the laa. For example, the map can be a plan view map showing the entire layout of the zoo, amusement park, shopping mall etc., showing the user's current location at the laa. The map could be sent for example to the user initially in a most zoomed-out view. The user can then zoom-in and translate the map as desired to see closer views of desired locations and attractions within the laa. If the map includes the user's current location, an icon or symbol representing the user is shown on the map at the current location in relation to the attractions.

It is also expressly contemplated to allow two or more users to "share" the same map, such that icons representing the two or more users are shown on the same map. The maps are displayed continuously for as long as the user desires. For example, the sender could send the map to a first receiver, after which icons representing the current locations of both the sender and the receiver appear on the same map. The sender could then send the same map to a second receiver, after which icons representing the current locations of all three of the sender, first receiver and the second receiver appear on the same map.

Alternatively, systems 110 and 150 can be configured to allow one user to be designated as a host. Server 12 supplies the host user with a code or access number. The host user sends the code or access number, e.g., via text or email, to one or more selected recipients. Any one of the selected recipients can then initiate communication with server 12 and enter the code or access number. The recipient then "joins" the map with the host user and any other recipient that has already joined the map.

With multiple icons moving about the map, it is contemplated to enable the user's of the map to identify the icons. Because server 12 knows the identity of each dot or icon, server 12 can assume that a selection of any of the icons to be a request by the selecting user to have the selected icon identified. Server 12 identifies the selected icon by displaying the icon user's cdd number, or if the requesting user has a contact name for the cdd number, the contact name is displayed.

It is expressly contemplated for any type of shared map to allow the map to be mutually exclusively manipulated by the attending users. That is, if one of the user's zooms into a particular area of laa 102, the other user's maps do not follow suit. The other users can be zooming-in or zooming-out of other areas of the shared map at the same time. It is however contemplated to allow alarms or meeting times to be entered into the shared map, such that when an alarm or meeting time is reached, server 12 takes over control. Here, server 12 can interrupt each user's map, for example, by fully zooming-out the maps of each user. Each user is then provided with a route on the map leading from the user's current location to a predefined and pre-entered meeting place. If resolution permits, the routes of each of the user's can be generated on all of the cdd's, such that the user's can each monitor each other's progress in moving to the predefined meeting place.

The meeting place can for example be selected from a list developed for the laa, such as laa 102. Perhaps the meeting place is for lunch. The users in the morning agree on a time and place for lunch. One of the user's, e.g., the host user, programs into the map the meeting time and selects, e.g., from a dropdown menu, the desired restaurant or food location. The entered time can be the time to initiate movement towards the meeting place, for example, everyone decides to make their way towards lunch at 11:45 AM, which is then the entered time. Or, the entered time can be the actually planned meeting time at the meeting place, in which case server 12 takes over the map at a time ahead of the meeting time, e.g., at 11:45 AM for an entered time of noon, to allow the users enough time to reach the meeting place.

System Algorithms

Figure 4B:
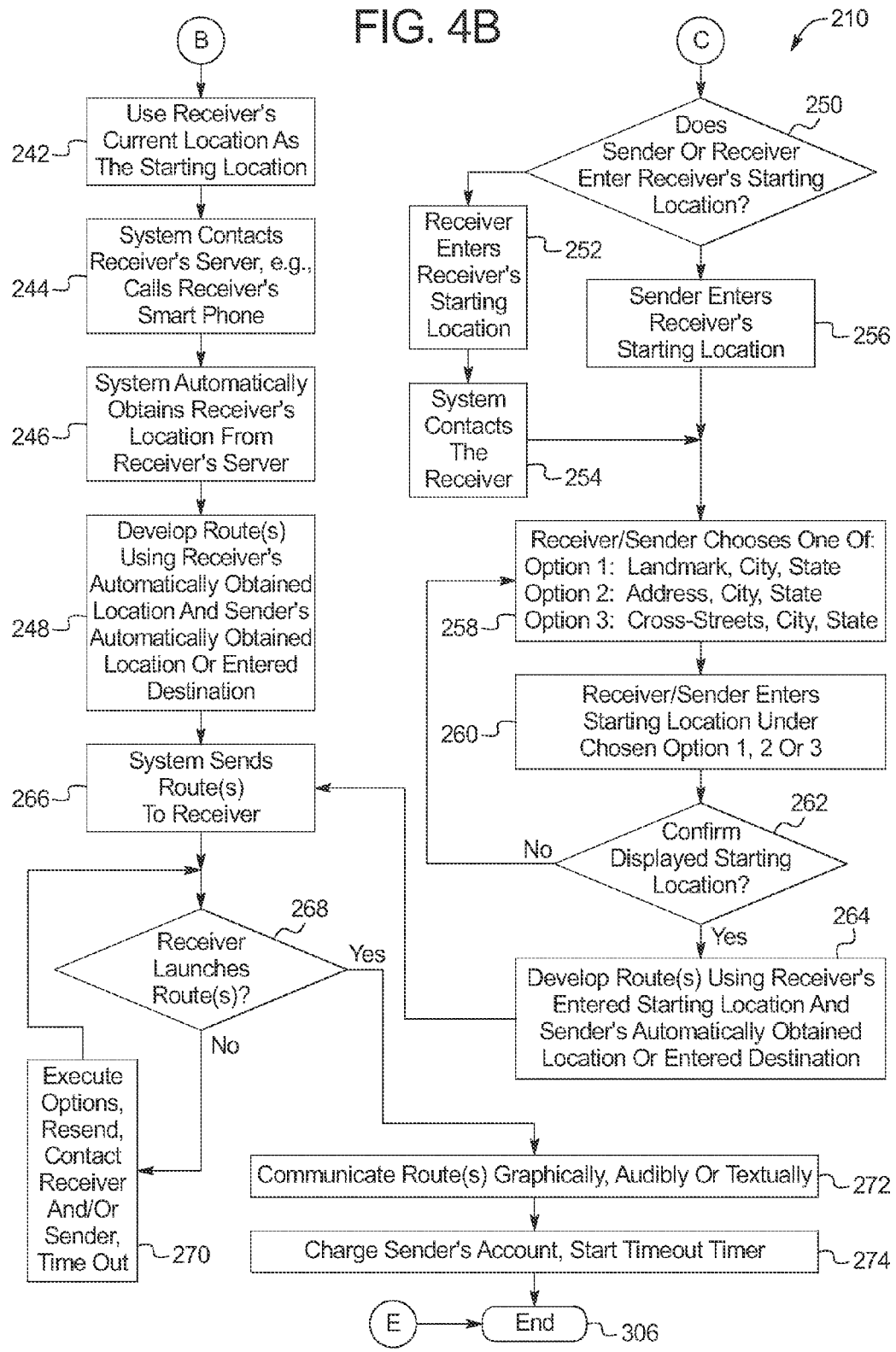
FIG. 4 (FIGS. 4A to 4C) is a schematic flow diagram illustrating various embodiments for employing the multi-party navigational or route generation systems of the present of the present disclosure.
Figure 4C:
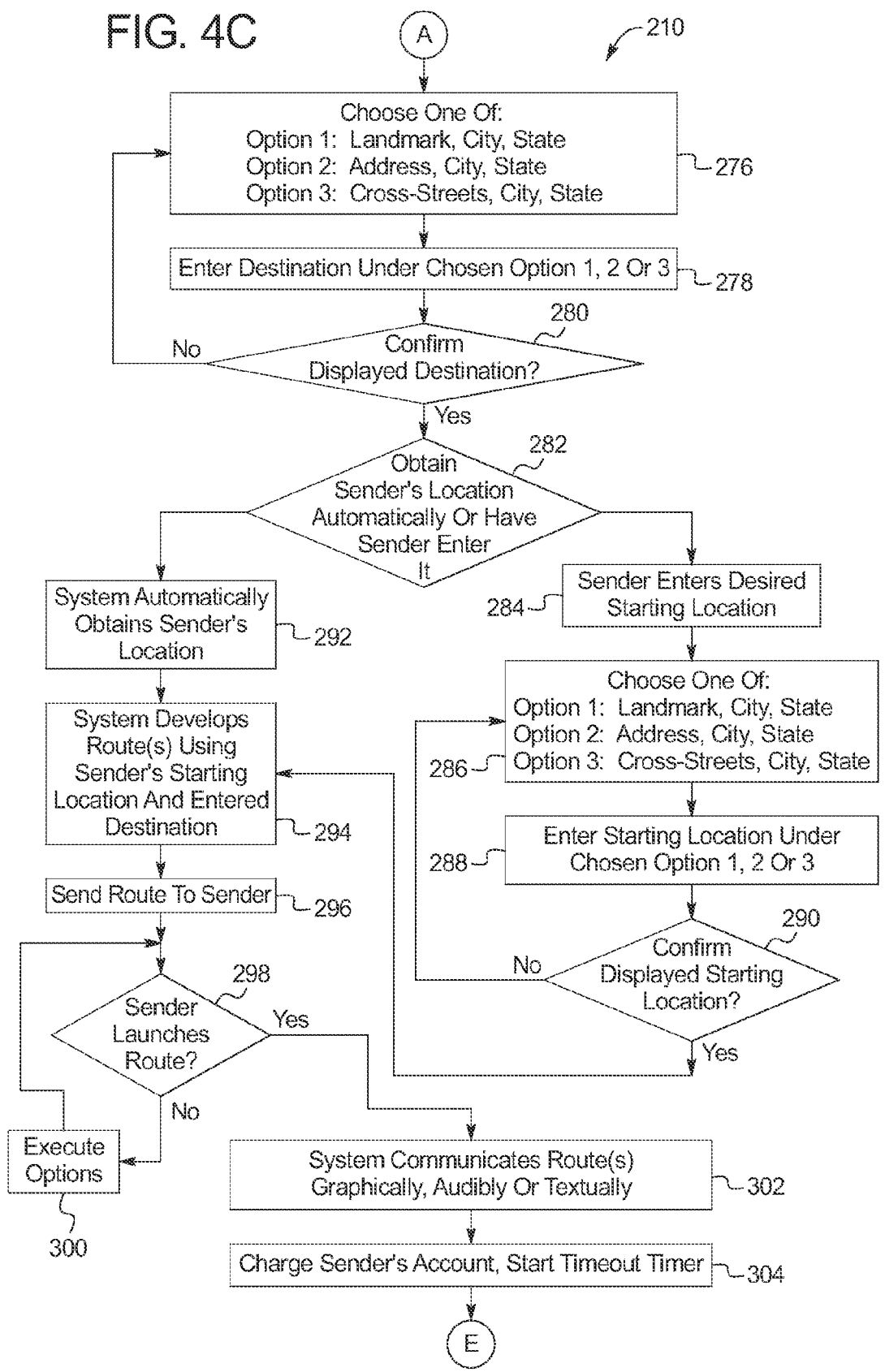

Referring now to FIG. 4, one embodiment for an operational flow schematic usable with any of the systems described herein is illustrated by method 210. Method 210 of FIG. 4 is shown as a composite of three FIGS. 4A to 4C. It should be appreciated however that an implementation of method 210 would not have to include all of the methodology of FIGS. 4A to 4C. Instead, an implementation could use a selective one or more of the various "meet me here", "meet me there" or "I need directions" route generation implementations. The combined methodology of FIGS. 4A to 4C into a single FIG. 4 does however show one way of implementing multiple sub-methodologies into a single algorithm and thus into a single application operable by the sender's and/or receiver's cdd.

Multi-User Routes

In FIG. 4A of FIG. 4, method 210 begins at oval 212. The sender "calls", "texts" or otherwise enlists or invokes the application at block 214, e.g., via calling from sender's cdd 20 to the application server 12 via any of the systems and suitable networks described herein.

At diamond 216, processing 14, memory 16 and associated software of server 12 determine whether the eventual route or map to be generated is for the sender or a second party receiver. In an embodiment, server 12 sends a query back to the sender's cdd 20. The query can be as simple as "Route for YOU or ANOTHER?", where "YOU" or "ANOTHER" are either selectable areas of the touch screen associated with sender's cdd 20 or are placed adjacent to selectable off-screen buttons, one each dedicated for "YOU" and "ANOTHER", in one example. Thus, it is contemplated in one embodiment for the sender to not have permanent application software installed on the user's cdd 20. Instead, the sender can call or text the application from the user's contact list, from the user's recently called/texted list or by entering a number, e.g., 1-800-GET-SENDMAP to call or text.

In an alternative embodiment, sender's cdd 20 includes an application button (touch screen or icon selected by an off-screen button) that launches the application, which can automatically call, text or communicate with application server 12 to prompt the query to be sent back to sender's cdd 20 as discussed at diamond 216 above.

Further alternatively, launching the application automatically causes the sender's cdd 20 to query the sender, before calling application server 12, whether the route is for the sender or another. Upon receiving the sender's instructions, sender's cdd 20 calls application server 12 to establish communication and to deliver the selection of whether the route is for the sender or the receiver.

If the route is for the sender, as determined at block 218, the subroutine illustrated and described with respect to FIG. 4C (discussed below) is executed. If the route is instead for the receiver, as determined at block 220, the receiver's E-address is entered into the processing 14, memory 16 and associated software of application server 12. In one embodiment, the sender supplies the receiver's E-address to application server 12. The receiver's E-address can be the receiver's smart phone or cdd number. The receiver's E-address or cdd number can be provided by the sender in response to a query, e.g., in the same response to the query presented at diamond 216, so that two separate queries do not have to be made. For example, when responding to the query from server 12, "Route for YOU or ANOTHER?", the sender can select "ANOTHER" (using any of the input schemes discussed above) and at the same time enter the receiver's cdd number. Thus in one reply, the sender selects the route option and provides the receiver's E-address.

Alternatively, if the sender's cdd 20 includes the application button mentioned above that launches the application, the sender can select "ANOTHER" and at the same time enter the receiver's cdd number. Here, there is no query back to the sender from server 12. Instead, the sender initiates contact with server 12 by providing the route selection option (block 220) and the receiver's E-address (block 224).

At diamond 226, processing 14, memory 16 and associated software of server 12 determine whether the sender wants to use the sender's current location as a destination for the route or to enter a destination for the route. Another way of looking at the question of diamond 226 is whether the sender wants the receiver to "meet me here" (current location) or "meet me there" (entered destination)? As before, the answer to the question of diamond 226 can be provided as a response to a query from server 12 or in an initial packet of information from sender's cdd 20 to server 12.

In the first instance, the sender can answer "Use my CURRENT LOCATION" as the destination or "ENTER DESTINATION" in response to a query from server 12, e.g., in the same response to the query presented at diamond 216, so that separate queries do not have to be made. For example, when responding to the query, "Route for YOU or ANOTHER?", the sender can (i) select "ANOTHER" (using any of the input schemes discussed above), (ii) in the same response enter the receiver's cdd number, and (iii) in the same response enter the desired route destination type. Thus in one reply, the sender selects the route option, provides the receiver's E-address and selects the destination type.

Alternatively, if the sender's cdd 20 includes the application button mentioned above that launches the application, the sender can select "ANOTHER", at the same time enter the receiver's cdd number, and at the same time select the destination type. Here again, there is no query back to the sender from server 12. Instead, the sender initiates contact with server 12 by providing the route selection option, the receiver's E-address and the route destination type.

At block 228, the sender chooses to enter a destination via any of the techniques just discussed. At block 228, the sender is telling the receiver to "meet me there" instead of "meet me here".

At block 230, processing 14, memory 16 and associated software of server 12 prompt the sender to choose one of three destination entry options. At block 232, sender chooses one of the options and enters a destination accordingly. Under Option 1, the sender enters a landmark, such as a ballpark, zoo, shopping mall, library, school, store, restaurant, park, public facility, service facility, etc., in combination with the landmark's city and state. Here, the sender does not need to know the exact address of the landmark. Instead, the sender knows the name of the landmark and its rough location, e.g., city and state. It is contemplated that certain landmarks are well known enough that server 12 will assume the well known version of the landmark is the one that the sender is attempting to enter (assuming that more than one landmark bearing the entered name is stored in the at least one memory 16 of server 12. For instance, server 12 might assume the "Empire State Building" and the "Washington Monument" are the well known New York City and Washington D.C. landmarks as opposed to like-named structures existing elsewhere.

In another embodiment, server 12 is programmed to compare the request against the sender's current location. Thus for example if a second "Empire State Building" existed in California and the sender's current location is sensed to be in California, especially if in the same city as the California-based "Empire State Building", server 12 is programmed to choose the local landmark as the destination to be entered at block 232. In any case, it is contemplated for system 12, or the application on sender's cdd 20 to confirm the entered destination as discussed below at diamond 224.

It is also contemplated for server 12 to use the user's sensed location in situations in which a franchised landmark having multiple store or franchise locations when (i) the city is unknown to the sender or (ii) when multiple stores are located in the same city. Server 12 can display back a set of possible landmarks to the sender and order the landmark choices first to last according to geographic closeness, with the closest store or landmark being first and the furthest store or landmark being last (e.g., up to the five closest stores, all stores within a certain radius, all stores within a certain zip code, or some combination thereof). The sender then chooses the desired location, e.g., via a touch screen selection of the store button directly or via hard key selection of an arrow (for example) until the desired location is highlighted, followed by a hard key selection of "enter" or some other intuitive hard key button.

Server 12 can also attempt to correct for a misspelling by presenting a list of possible landmark locations with similar spellings. Server 12 here employs a subroutine similar to known systems used by word processing programs that take into account landmark names, for example, that sound like the misspelled landmark, that have the same first few letters of the misspelled landmark, and/or that have the most consecutive letters in common with the misspelled landmark. Here, server 12 can order the landmark choices according to geographical proximity to the sender's entered city and state at block 230, if entered, and/or according to the sender's current location.

It should be appreciated that server 12 of the systems described herein attempts to be as user friendly as possible to make up for the sender's (i) lack of knowledge of the landmark and/or its location, (ii) inability to spell correctly, and (iii) improper data entry. It should also be appreciated therefore that the user's correct knowledge of less than all of the landmark, city and state is enough in most cases to satisfy Option 1 presented at block 230.

Option 2 at block 230 calls for the sender to enter an address, city and state (in the United States or similar addressing systems in other countries). Option 2 is more for residences than landmarks, although knowing the correct address of a landmark would achieve the same "meet me there" goal. Server 12 for Option 2 in an embodiment assumes the desired state (of the United States) to be the current GPS or MTC state of the sender if none is entered. Server 12 can even be programmed to assume the city to be the sender's GPS city or nearby cities and send a list of possibilities from which to select as described above with Option 1 (e.g., listed first to last in order of geographical closeness). Server 12 can likewise use the word processing subroutine above to present words, e.g., street names, which are close to the misspelled word according to the subroutine.

Option 3 at block 230 calls for the user to enter a pair of cross-streets, city and state. Option 3 may be found to be very convenient and accurate for dwellers within larger cities. The likelihood even in larger cities of multiple intersections having the same cross-streets is small. In the event that such a duplicate occurs, server 12 can be programmed to prompt the user to make a selection between two or more occurrences of the same set of cross-streets, e.g., "Street A and Street B downtown or Street A and Street B on northside?" Again, server 12 can list the duplicates in order, first to last, according to geographical closeness to sender's cdd 20, the closest intersection being listed first. Again, it is contemplated that the sender need not enter all three of (i) the pair of cross-streets, (ii) city and (iii) state. Indeed, just the cross-streets may suffice for maps having local destinations. City and state may help however in identifying misspelled street names. It is contemplated again to use the word processing subroutine above to present words, e.g., street names, which are close, according to the subroutine to the misspelled word.

At diamond 234, server 12 or the application on sender's cdd 20, prompts sender to confirm or discard the displayed destination. Diamond 234 also encompasses the situation in which the sender is presented with a list of possibilities, provided for any of the reasons discussed above, as outcomes from the information that the sender enters at block 232. If the sender agrees with the single destination presented or is able to pick one of the destinations from a list, the sender indicates (e.g., via touch screen or hard key press) that the destination is confirmed, upon which route generation method 210 advances to the next step. If the sender does not agree with the single destination presented or is not able to pick one of multiple destinations from a list, the sender indicates (e.g., via touch screen or hard key press) that no destination is confirmed, upon which route generation method 210 returns to block 230. The loop between block 230 and diamond 234 is repeated until the sender confirms a destination. Upon a second, third, etc., time through the loop, sender can try different ones of Options 1, 2 and 3 in an attempt to have the desired destination generated.

Blocks 230 and 232 indicate that the sender enters both the choice of Option 1, 2 or 3 and the entry of a destination according to the chosen option. In such an embodiment, the sender can press an option button selecting an option and then enter the rejected information. Alternatively, server 12 detects the option selection as part of the destination text entry, e.g., server 12 may establish a protocol in which the sender types "1:", "2:" or "3:", followed by the destination, e.g., "3: Clark and Addison". If a well known landmark exists near the address entered under Option 2 and Option 3, it is contemplated for server 12 to prompt the confirm at diamond 234 by adding the landmark, e.g., "Confirm destination: Clark and Addison, Wrigley Field".

In an alternative embodiment, server 12 does not require the sender to make an express option selection and instead infers the option selection from the destination text entry. For example, server 12 can be programmed to assume that a destination beginning with a number is an address under Option 2 but to double check that the number in combination with the following name (assumed to be a street name) is not instead the name of a landmark, e.g., a restaurant or store. For example, the address "101 Grille St." might be confused with a restaurant named, "101 Grille". If both entities exist for a given city and state, server 12 can look for "St.", "Ave.", "Ln.", etc. after the word "Grille" to determine which destination is desired. Alternatively or additionally, server 12 displays both entities on sender's cdd 20 and allows the sender to choose the correct destination. In an embodiment, the selection by sender of a destination from a list of possible destinations serves also as the confirm input entered at diamond 234.

Processing 14 and memory 16 of server 12 can also be programmed to look for the word "and" between two words or groups or words. If such an "and" is found, server 12 assumes that an Option 3 entry has been entered. Again however, server 12 double checks to see that the entry does not double as a land mark. For example, the entry "Truman and Company" could be two cross-streets or a company name. If the sender places a "St." after either name, server 12 knows the difference. If not, server can again display both entities on sender's cdd 20 and allow the sender to choose the correct destination. Again, the selection by sender of a destination from a list of possible destinations can also serve as the confirm input entered at diamond 234.

It is contemplated that all information up to the confirm entry at diamond 234 can be entered alternatively in the initial bolus of information from the sender to server 12 without any interruption from the server. That is, after initiating the application on sender's cdd, sender sends one data message to server 12 including: (i) a choice of route as intended for receiver, (ii) receiver's data E-address, (iii) an entry of destination instead of using the sender's current location, and (iv) entry of destination option and destination address. As stated before, destination option can be integrated into destination address. It is also expressly contemplated to use the entry of a destination to additionally signal at (iii) the desire to enter a destination as opposed to using the sender's current location. Thus (i) to (iv) above can be condensed to: (i) a choice of route as intended for receiver, (ii) entry of receiver's data address, and (iii) entry of destination address.

Back at diamond 226, when sender is questioned whether the sender wants the receiver to "meet me here" or "meet me there", sender at block 236 chooses to let server 12 use sender's current location as the route destination. At block 236, the sender is telling the receiver to "meet me here" instead of "meet me there". The "meet me here" entry can be entered into a response to a query from server 12 to sender's cdd 20. Or, like above, the sender can designate a "meet me here" selection upon an initial communication from sender's cdd 20 to server 12. That is, after initiating the application on sender's cdd, sender sends one data message to server 12 including: (i) a choice of route as intended for receiver, (ii) the receiver's data address, and (iii) entry of desire to use sender's current location.

At block 238, server 12 automatically obtains sender's location. Server 12 assumes sender is located with sender's cdd 20. The location of sender's cdd 20 is known via the GPS or MTC operating with sender's server 40. Application server 12 requests and obtains sender's location from sender's server 40.

At diamond 240, server 12 knows the recipient's E-address or phone number and the desired destination, be it the "meet me there" or "meet me here" location. At diamond 240, server 12 determines whether the sender wishes to use receiver's current location for the route's starting location ("start from current") or instead enter a different, desired starting location ("start from another"). In the latter situation for example, the sender may know that the receiver is heading to a location and will need a route from that location to the destination. Or, a group of people may be meeting at a starting location and need directions from the meeting location to the destination.

At FIG. 4B of FIG. 4, method 210, which may be performed via any of the systems described herein, resumes at "B" and "C", which are the two possible outcomes at diamond 240 in FIG. 4A of FIG. 4 of method 210. Resuming at "B" and block 242, server 12 is directed to use the receiver's current location as the route's starting location. As before, sender can enter this information as a response to a request from server 12. Or, sender can enter the "start from current" election upon an initial communication from sender's cdd 20 to server 12. Thus, for a route combination of "meet me there" and "start from current", sender can initially enter: (i) a choice of route as intended for receiver, (ii) receiver's data address, (iii) destination address, and (iv) a choice of receiver's current location as the route's starting location. And for a route combination of "meet me here" and "start from current", sender can initially enter: (i) a choice of route as intended for receiver, (ii) receiver's data address, (iii) a desire to use sender's current location as the destination, and (iv) a choice of receiver's current location as the route's starting location. It should be appreciated that in the "meet me here" and "start from current" scenario, no address needs to be entered.

At block 244, server 12 contacts receiver's server, e.g., a wired or wireless call, text or data message to receiver's server 60. The message in an embodiment requests the location of receiver's cdd 30 from receiver's server 60. Receiver's server in turn uses its GPS or MTC capability to locate receiver's cdd 30. At block 246, receiver's server 60 sends the current location of receiver's cdd 30 to application server 12 via a wired or wireless communication.

At block 248, processing 14, memory 16 and associated software of server 12 develop one or more route from (i) receiver's automatically obtained cdd 30 starting location ("start from current") to the sender's automatically obtained cdd 20 location ("meet me here") or from (ii) receiver's automatically obtained cdd 30 starting location ("start from current") to the sender's entered destination ("meet me there"). Multiple routes may be generated to attempt to find, e.g., the shortest distance traveled, the shortest time needed, a route that best avoids traffic, or some combination thereof, which then can be provided as options to the receiver.

Resuming instead at "C" and diamond 250, server 12 is directed to use an entered location for the receiver ("start from another") as the route's starting location. Here, method 210 can be configured to provide the option of selecting the "start from another" location to the sender or the receiver. That is, the sender may already know the desired starting location. Or, the sender may know or suspect that the receiver will want to enter the starting location.

At block 252, the sender elects to let the receiver enter the receiver's starting location. System 12 can query the sender to determine that the sender wishes the let the receiver enter the receiver's starting position. Or, sender can enter the "start from another, receiver enters" option upon an initial communication from sender's cdd 20 to server 12. For a route combination of "meet me there" and "start from another, receiver enters", sender can initially enter: (i) a choice of route as intended for receiver, (ii) receiver's data address, (iii) destination address, and (iv) a choice of another receiver location, to be entered by the receiver, as the route's starting location. And for a route combination of "meet me here" and "start from another, receiver enters", sender can initially enter: (i) a choice of route as intended for receiver, (ii) receiver's E-address, (iii) a desire to use sender's current location as the destination, and (iv) a choice of another receiver location, to be entered by the receiver, as the route's starting location.

At block 254, server 12, knowing receiver's data address, contacts the receiver, identifying the receiver and requesting the receiver to enter a desired starting location. Server 12 can contact the receiver via telephone contact or via text or data communication. In a text or data communication, the communication can be provided with an attachment that when opened launches the application and allows the receiver to enter the route's starting location. Or, the receiver can already have the application software installed on the receiver's cdd 30. Upon receiving the text or telephone request to enter the route's starting location, the receiver launches the application, which enables the receiver to enter the route's starting location.

At block 256, the sender instead elects that the sender is going to enter the receiver's starting location. System 12 can query the sender to determine that the sender wishes to enter the receiver's starting position. Or, sender can enter the "start from another, sender enters" option upon an initial communication from sender's cdd 20 to server 12. For a route combination of "meet me there" and "start from another, sender enters", sender can initially enter: (i) a choice of route as intended for receiver, (ii) receiver's E-address, (iii) destination address, (iv) a choice of another receiver location, to be entered by sender, as the route's starting location, and (v) the other location for the receiver's starting location. Items (iv) and (v) may alternatively be merged into a single entry in which sender's entry of the other location for the receiver's starting location also serves as the election by the sender to do so. And for a route combination of "meet me here" and "start from another, sender enters", sender can initially enter: (i) a choice of route as intended for receiver, (ii) receiver's data or E-address, (iii) a desire to use sender's current location as the destination, (iv) a choice of another receiver location (entered by sender) as the route's starting location, and (v) the other location for the receiver's starting location. Again, items (iv) and (v) may be merged alternatively.

At blocks 258 and 260, the receiver (via block 252) or sender (via block 256) chooses a starting location entry option, e.g., Option 1, Option 2 or Option 3 (block 258) and enters the starting location under the chosen Option 1, 2 or 3 (block 260). At diamond 262, server 12, or the application on the appropriate cdd 20 or 30, prompts the receiver (via block 252) or sender (via block 260) to confirm the entered starting location. A loop between block 258 and diamond 262 continues until the displayed starting location is confirmed. All structure and functionality, including all alternatives thereof, discussed above for blocks 230 and 232 and diamond 234, including all option entry structure, functionality and alternatives discussed in connection with block 230, all destination entry structure, functionality and alternatives discussed in connection with block 232, and all confirm or discard structure, functionality and alternatives discussed in connection with diamond 234 are applicable, respectively, to the route starting location entry of blocks 258 and 260 and diamond 262.

At block 264, processing 14, memory 16 and associated software of server 12 develop one or more route from (i) receiver's entered (by sender or receiver) starting location ("start from another") to the sender's automatically obtained cdd 20 location ("meet me here") or from (ii) receiver's entered (by sender or receiver) starting location ("start from another") to the sender's entered destination ("meet me there"). Multiple routes may be generated to attempt to find, e.g., the shortest distance traveled, the shortest time needed, a route that best avoids traffic, or some combination thereof, which then can be provided as options to the receiver.

At block 266, server 12 and method 210, under any of the systems described herein, sends the route(s) (either a "start from here" route via block 248 or a "start from another" route via block 264) to the receiver. To do so, server 12 communicates via any of the communication protocols discussed herein with receiver's cdd 30 via receiver's server 60. It is contemplated for example to send the route as an attachment to a voicemail or email message. It is also contemplated to alternatively or additionally attempt to contact receiver by text or telephone (e.g., via a recorded message played live to receiver or left via voicemail) notifying the receiver to activate receiver's application, which has a route waiting to be launched.

It is contemplated at diamond 268 for processing 14, memory 16 and associated software of server 12 to monitor whether the receiver has launched or opened the route. Diamond 268 could for example start a timer. If after a certain time period the receiver has not launched the route, server 12 can execute any one or more of a multitude of options as illustrated at block 270. For example, server 12 can resend the route(s) via any one or more of the modes discussed above in connection with block 266. Server 12 can alternatively or additionally contact the sender to let the sender know that the route remains unlaunched. Or, server 12 can contact or re-contact the receiver to let the receiver know that a route is waiting for launch on the receiver's cdd 30. This update can also be relayed to the sender. Finally, e.g., after a longer period of time, server 12 can time out and either pull the route if possible or alternatively not support the route if eventually launched.

When the receiver launches the route at diamond 268, the route is played for or communicated to the receiver via the receiver cdd 30 graphically, audibly and/or textually as illustrated at block 272. It is also contemplated to let the sender know, e.g., via text, email or voicemail that receiver has launched the route.

It is contemplated for the route to simply be a text or email message that describes the route in written words. Alternatively or additionally, the text or email could be provided with a link or attachment that allows application software to be launched on the receiver's cdd 30, such that the receiver does not have to have the software preinstalled on the cdd. The link or attachment opens to provide a graphical map of the route. Alternatively or additionally, the text, email or voicemail directs the receiver to software preinstalled on the receiver's cdd 30. The route is launched in that software, e.g., on a graphical map. It is contemplated to launch the route in any one or more of these formats simultaneously. For example, the word version of the route could be sent by text or email. At the beginning or end of the word version, a message is provided, e.g., "click on [link or attachment] or go to your phone's application to see map of route".

"Hit Me" Voice Guidance Option

As discussed above, it is contemplated to alternatively or additionally provide an audible or voice guidance route. This option may be particularly useful for a person driving a vehicle. For this option, the receiver activates the speaker system of receiver's cdd 30. One problem with known voice navigation systems is that the system determines when a new audio update should be given. In between updates, the user or driver may become nervous or feel lost, not knowing when the next voice update will come. It is therefore contemplated with method 210, in any of the systems described herein to provide a "hit me" button or actuator (touch screen or hard key based) that when actuated provides an up-to-date, real time, voice guidance message.

The voice guidance updates could be calculated using the GPS or MTC associated with receiver's server 60, which sends, either intermittently or upon request, updates of the receiver's location to application software on receiver's cdd 30. The application software knows the distance of each leg of the route, can calculate a distance remaining on a current leg of the route upon receiving a GPS or MTC coordinate, and stores the digital voice files needed to match a "distance remaining on the leg" file with a "street name or number" file and files containing other needed words or phrases, e.g., "in", "on", "make a right turn" and "make a left turn". The matched voice files faun a cohesive audio message for the receiver. The cohesive audio message is formed and delivered directly from the application software to the sound card and speakers of cdd 30 when the "hit me" button is pressed in one embodiment.

Or, the voice guidance updates could be calculated using the GPS or MTC associated with receiver's server 60 sending, either intermittently or upon request, updates of the receiver's location to the software of processing 14 and memory 16 of server 12. The server 12 software in this alternative knows the distance of each leg of the route, can calculate a distance remaining on a current leg of the route upon receiving a GPS or MTC coordinate, and stores the digital voice files needed to match a "distance remaining on the leg" file with a "street name or number" file and the other files (examples above) to form a cohesive audio message for the receiver. The cohesive audio message is formed and delivered by server 12 to the application software at receiver's cdd 30, which in turn delivers the digital files to the sound card and speakers of cdd 30 when the "hit me" button is pressed.

It is contemplated to interject voice guidance updates when needed in combination with the selective voice guidance provided via the "hit me" button. For example, if the distance remaining on the current leg of the route falls below a certain value, e.g., one-half or one-quarter mile, the application is commanded to execute a voice guidance calculation and delivery, either directly at receiver's cdd 30 or via server 12 as described above. The automatically executed voice guidance update can be overridden if the receiver has generated the "hit me" voice guidance update within a certain distance (for example, one-quarter mile) of the auto-generation threshold distance. A final automatic reminder to turn, for example, may not be overridden in one embodiment. Thus, the receiver can use the "hit-me" button as often as desired to receive selective voice guidance updates, however, the application will interject a voice guidance update when needed, e.g., if the receiver has waited too long to initiate a "hit me" voice guidance update.

As discussed above in connection with diamond 250 to block 264, method 210 includes the scenario in which the sender or receiver enters the recipient's starting location. In such case, there is likely a distance between recipient's current location and the designated starting location. It is contemplated for the voice guidance mode of communicating the route to also guide the recipient from the current cdd 30 location to the starting location. In one alternative, the receiver is simply told to "proceed to the designated starting location". Likewise, in the graphical and/or textual modes of communicating the route set forth at block 272, it is also contemplated to flash a textual message, e.g., "proceed to start" and/or to provide an initial map guiding the recipient graphically to from the recipient's current location to the designated starting location.

Mapping Display Features/Safety

Any and all structure, functionality and alternatives discussed above in connection with the local application areas for the displaying of the laa maps is applicable to the display of the larger area maps. It is contemplated to provide "food", "gas", "convenience", "supermarket", or even specific store name buttons or other buttons (virtual or hard key). When the recipient presses one of these buttons, recipient's cdd 30 shows flags or other markers pointing to locations along the route (or perhaps just off the route) having the selected type or brand of store or service. The flags or markers may be selectable to show more detailed information concerning same.

Safety is an important component in the implementation of the systems and methods of the present disclosure. The route is sent from server 12 to the receiver. In an embodiment, sender cannot see the route. Thus the sender cannot ascertain the receiver's current position, perhaps against the receiver's wishes, via the systems and methods discussed herein. It is expressly contemplated however to allow the recipient, for example, if the recipient recognizes the sender, who is identified by phone number, email address, contact name or some combination thereof in one embodiment, to allow the sender to see the map and to track the recipient's progress from the starting location to the destination location.

It is contemplated to provide a yes/no query on the map to allow the recipient to decide yes or know to "let sender see route?". It is further contemplated for method 210 to follow a "yes" response to "let sender see route?" with a confirm requirement, such that the sender cannot see the route unless the recipient confirms the choice of "yes". The confirm requirement helps to avoid inadvertent "yes" responses. Upon receiving confirmation, server 12 sends the same route sent at block 266 to sender's server 40, which relay's the route to sender's cdd 20. The sender then launches the route and the route is communicated to the sender in the manner described in connection with diamond 268 and block 272.

Further regarding safety, it is contemplated to allow sender's cdd 20 and receiver's cdd 30 to be mated in software, such that sender's cdd 20 is seen as a parent or master cdd, while receiver's cdd 30 is seen as a child or delegate cdd. Here, whenever a route is sent from the sender to the receiver, the sender or "parent" is automatically allowed to see the map and thus the receiver's or child's current location, assuming the sender or parent chooses a "start from current" option. It is further contemplated for method 210 and server 12 to require that the parent cdd 20 be password protected before enabling the parent cdd 20 to automatically view the map. Password protection helps to prevent someone besides the parent from accessing the child cdd's location.

Under any "meet me here" scenario described herein in which the sender's current location is the selected destination, it is contemplated for method 210 and any of the systems described herein to monitor the sender's position and to modify the route, displayed on either one or both of recipient's cdd 30 and sender's cdd 20, if sender's position changes significantly, e.g., to another street or another address along a same street. In such case, the map may show a dot representing the recipient and a dot representing the sender moving in real time, or in a pseudo real time, with the corresponding route updating, e.g., at a suitable cycle rate, when the sender's location changes.

It is contemplated to provide a "reverse route" feature and a "reverse sender/recipient" feature. The first "reverse route" feature does not require the sender to see the route or map. The "reverse route" feature in essence takes the recipient home or back to the starting location at a later time, e.g., before the map or route times out. The "reverse route" feature in an embodiment begins initially from the original route's destination location. It may be that the recipient has moved from the destination location in the mean time. When receiver's GPS or MTC locates receiver's actual position, server 12 updates the route from the receiver's actual position to the original starting position for the route, which method 210 assumes is now the desired home destination.

The "reverse sender/recipient" feature is in general for a situation in which both the sender and receiver are able to view the map. The "reverse sender/recipient" option is provided to both the sender and receiver in one embodiment. When one of the sender or receiver initiates the "reverse sender/recipient" option, server 12 receives the request and relays the request through the appropriate server 40 or 60 to the cdd of the other of the sender and receiver. The other of the sender and the receiver is prompted to answer yes or no to the "reverse sender/recipient" request, and if yes, to confirm so in one embodiment. Upon confirmation, server 12 reverses the role of sender and recipient, so that server 12 assumes that the original sender is now the recipient who is to be moving towards the original receiver, who is now presumed to be at least relatively stationary. In an embodiment, after reversing sender and receiver roles, server 12 defaults to using GPS or MTC locations for cdd 20 and cdd 30 to generate or update the route map regardless of whether a starting or destination address had been entered originally.

Just like with the local application area maps, it is contemplated to provide a map in which three or more users participate. For example, the sender can send a route to multiple recipients, e.g., with a desired destination entered by sender as opposed to the sender's cdd 20 location. The map shows all parties traveling to the entered location, e.g., with a different symbol on the map for each participant. It is thus expressly contemplated in any system and method described herein that when the sender enters a destination address (e.g., at block 228), instead of using the sender's cdd 20 location, and that if the sender is permitted to view the map, the shared map additionally shows the sender moving from the sender's current cdd 20 location to the entered destination. It is therefore possible for all participants to track each person's progress towards reaching the destination. Any other alternatives discussed above for the shared and multiple receiver maps in connection with the local application areas are also applicable and expressly contemplated for the larger area routes and maps.

Charge For Service

Block 274 shows that in one embodiment, method 210 charges an account for the application that the sender has stored on sender's cdd 20 once the route is launched and communicated to the receiver (or communicated to multiple receivers and/or the sender as discussed in various alternatives above). Alternatively, the application charges the service running sender's server 40 and sender's cdd 20, which in turn passes the charge along to sender, e.g., via sender's monthly bill. Further alternatively, sender pays a one time fee for the application and the data transferred counts against whatever data limit the sender is under contract for with the service running server 40.

With the local application areas, it is contemplated for the local area entity, e.g., amusement park, museum, library, zoo, or shopping mall to charge a fee for allowing the mapping feature to be used. The laa can advertise a number for the user to call and accept the fee for using the virtual map. The laa can then charge the user's cellular service, which in turn passes the charge along to sender, e.g., via sender's monthly bill. Or, the laa once activated can ask for the sender's credit card number and accept same over a secured network. Further alternatively, the laa can have local stations or kiosks (FIG. 5), which ask for and accept the user's E-address (e.g., cellular phone number) and also provide scanner or a reader with which the user can slide and scan the user's credit card. In an embodiment, any paying user can be an initiator or sender and also receive the mapping benefits. The sender can have an unlimited amount of recipients under the fee. In a situation in which multiple percipients are sharing a same map, it is contemplated to charge an additional fee, e.g., for each additional person sharing the map. For example, the initial fee for the sender can be $1.00 for unlimited use of the mapping system over a twenty-four hour period. The laa system can also provide the option of adding one or more recipient's to a shared map at, e.g., $0.25 a person.

Referring again to FIG. 4B, at oval 306 method 210 ends.

Single User Routes

At FIG. 4C of FIG. 4, method 210, which may be performed via any of the systems described herein, resumes at "A", which is the outcome at diamond 216 in FIG. 4A of FIG. 4, in which the sender selects to have a route generated for sender's use. Resuming at "A" and blocks 276 and 278, the sender chooses a destination location entry option, e.g., Option 1, Option 2 or Option 3 (block 276) and enters the starting location under the chosen Option 1, 2 or 3 (block 278). At diamond 280, server 12, or the application on sender's cdd 20, prompts the sender to confirm the entered destination location. A loop between block 276 and diamond 280 continues until the displayed destination location is confirmed. All structure and functionality, including all alternatives thereof, discussed above for blocks 230 and 232 and diamond 234, including all option entry structure, functionality and alternatives discussed in connection with block 230, all destination entry structure, functionality and alternatives discussed in connection with block 232, and all confirm or discard structure, functionality and alternatives discussed in connection with diamond 234 are applicable, respectively, to the route destination location entry of blocks 276 and 278 and diamond 280.

At diamond 282, processing 14, memory 16 and associated software of server 12 determine whether the sender wants to use the sender's current location as a starting location for the route or to enter a starting location for the route. In either case, the route falls under the "I'm lost" or the "I do not know where I am going", that is, the "I need directions" variety. As before, the answer to the question of diamond 280 can be provided as a response to a query from server 12 or in an initial packet of information from sender's cdd 20 to server 12.

In the first or query instance, the sender can answer, "Use my CURRENT LOCATION" as the starting location or "ENTER STARTING LOCATION" in response to a query from server 12, e.g., in the same response to the query presented at diamond 216, so that separate queries do not have to be made. For example, when responding to the query, "Route for YOU or ANOTHER?", the sender can (i) select "FOR ME" (using any of the input schemes discussed above) and (ii) in the same response enter the desired route starting location type. Thus in one reply, the sender selects the route option and the route location type.

Further alternatively, if the sender's cdd 20 includes an application button mentioned above that launches the application, the sender can select "FOR ME" and at the same time select the starting location type. Here again, there is no query back to the sender from server 12. Instead, the sender initiates contact with server 12 by providing the route selection option, the desired destination and the route starting location type.

At block 284, the sender chooses to enter a starting location, that is, the sender needs directions from a place that the sender can get to. At blocks 286 and 288, the sender chooses a starting location entry option, e.g., Option 1, Option 2 or Option 3 (block 286) and enters the starting location under the chosen Option 1, 2 or 3 (block 288). At diamond 290, server 12, or the application on cdd 20, prompts the sender to confirm the entered starting location. A loop between block 286 and diamond 290 continues until the displayed starting location is confirmed. All structure and functionality, including all alternatives thereof, discussed above for blocks 230 and 232 and diamond 234, including all option entry structure, functionality and alternatives discussed in connection with block 230, all destination entry structure, functionality and alternatives discussed in connection with block 232, and all confirm or discard structure, functionality and alternatives discussed in connection with diamond 234 are applicable, respectively, to the route starting location entry of blocks 286 and 288 and diamond 290.

Back at diamond 282, when processing 14, memory 16 and associated software of server 12 query whether the sender wants to use the sender's current cdd 20 location as a starting location for the route or to enter a starting location for the route, the sender can instead chose to use the sender's current cdd 20 location. The "use current location" entry can be entered into a response to a query from server 12 to sender's cdd 20. Or, like above, the sender can enter the "use current location" selection upon an initial communication from sender's cdd 20 to server 12. That is, after initiating the application on sender's cdd, sender sends one data message to server 12 including: (i) a choice of route as intended for sender, (ii) the route destination, and (iii) an entry to use sender's current location as the starting location.

At block 292, server 12 automatically obtains sender's location. Server 12 assumes sender is located with sender's cdd 20. The location of sender's cdd 20 is known via the GPS or MTC operating with sender's server 40. Application server 12 requests and obtains sender's location from sender's server 40.

At block 294, processing 14, memory 16 and associated software of server 12 develop one or more route from (i) sender's current (block 292) or entered starting location (diamond 290) to the sender's entered destination. As before, multiple routes may be generated to attempt to find, e.g., the shortest distance traveled, the shortest time needed, a route that best avoids traffic, or some combination thereof, which then can be provided as options to the receiver.

At block 296, server 12 and method 210, under any of the systems described herein, sends the route(s) to the sender. To do so, server 12 communicates via any of the communication protocols discussed herein with sender's cdd 20 via sender's server 60. It is contemplated for example to send the route as an attachment to a voicemail or email message. Or, server 12 can prompt the sender via voice or text data to activate the sender's software to launch the route.

It is contemplated at diamond 298 for processing 14, memory 16 and associated software of server 12 to monitor whether the sender has launched or opened the route. Diamond 298 could for example start a timer. If after a certain time period the sender has not launched the route, server 12 can execute any one or more of a multitude of options as illustrated at block 300, such as those discussed above in connection with block 270. For example, server 12 can resend the route(s) via any one or more of the ways discussed above in connection with block 296. Server 12 can alternatively or additionally contact the sender to let the sender know that the route remains unlaunched. Finally, e.g., after a longer period of time, server 12 can time out and either pull the route if possible or alternatively not support the route if eventually launched.

When the sender launches the route at diamond 298, the route is played or communicated to the sender via the sender's cdd 20 graphically, audibly and/or textually as illustrated at block 302. Any of the structure, functionality and alternatives for graphically, audibly and/or textually playing or communicating the routes, including the "hit me" button, described herein are applicable to the route communication at block 302.

At block 304, method 210 can charge sender for the route sent to sender according to any of the embodiments discussed above in connection with block 274. FIG. 4C of method 210 is then directed to the letter "E", which appears at FIG. 4B of method 210. Referring again to FIG. 4B, at oval 306 method 210 ends.

Kiosk

Figure 5:
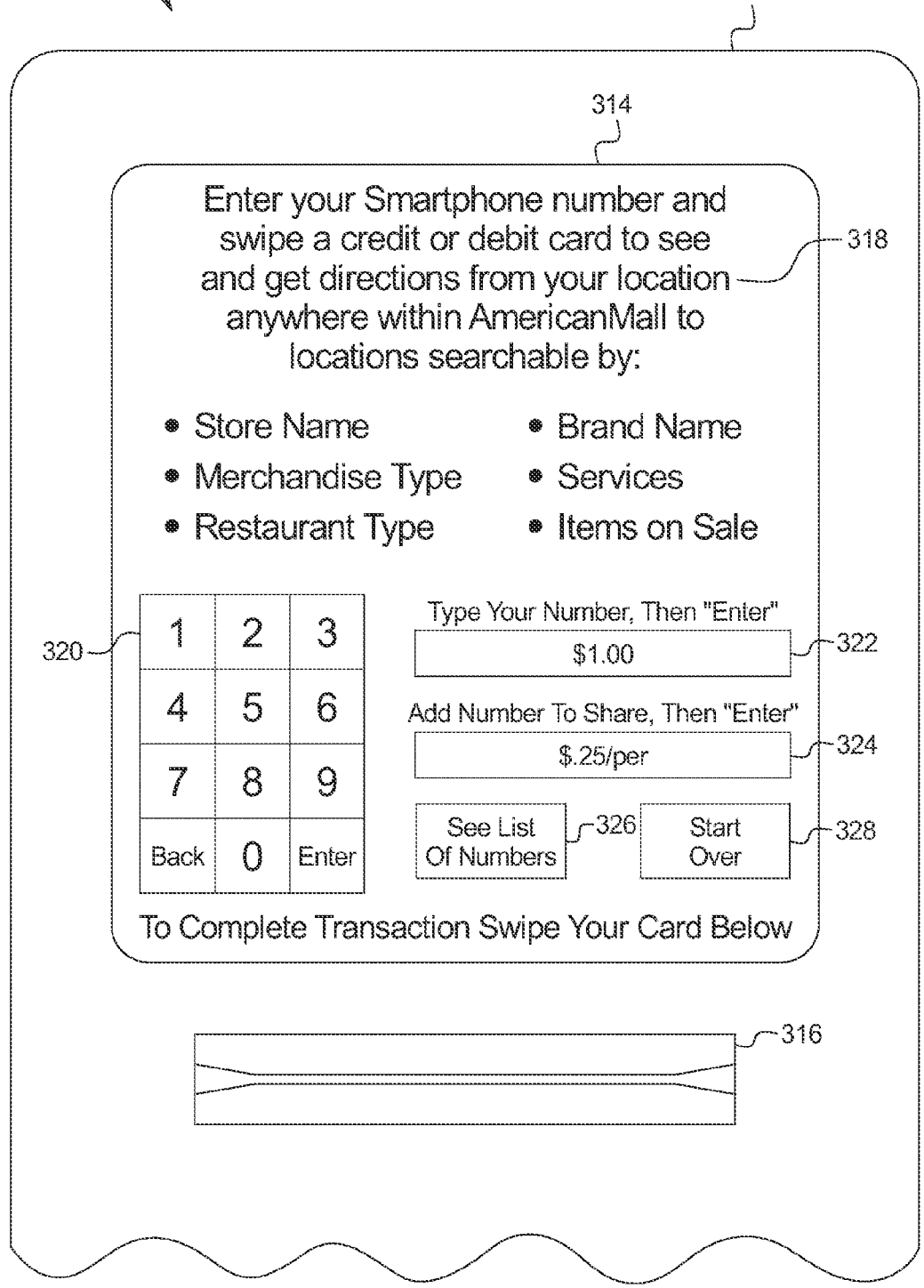
FIG. 5 is an elevation view of one embodiment of a kiosk for use with any of the laa systems discussed herein.

As discussed above, in one embodiment the local application area ("laa") employs a kiosk or local station for enabling a person to activate an laa map as has been described herein. Referring now to FIG. 5, one embodiment of such a kiosk or local station is illustrated by kiosk 310. It is contemplated to place multiple kiosks 310 within the laa (which can be any of the laa's described above), for example, near entranceways, in common areas, near telephone banks, etc. Kiosk 310 includes a housing 312 having a video monitor 314, such one operating with a touch screen. Video monitor operates alternatively with hard keys, such as membrane switches or keys. Housing 312 is also provided with a credit card or debit card reader 316. The buttons (touch screen or hard keys) and reader 316 are placed in functional communication with one or more processor and memory (not illustrated) located within housing 312, which operate software to process information entered by the user, including telephone number and credit/debit card information.

The processor and memory in an embodiment are linked with the other laa kiosks 310 to an laa hub server via a wired or wireless network, such as a WAN or LAN. The hub server can be local server 12 in FIG. 2 or be a separate server communicating via a suitable network with remote server 12 in FIG. 3.

Video monitor 314 displays an introductory message 318 explaining what the mapping system provides. In the illustrated embodiment, once the user enters the user's E-address (in the illustrated example the user's smart phone number), the user's cdd can display a map that begins from the user's current location to a destination within the laa that the user can select. The user can search for destinations, e.g., by store name, brand name, merchandise type, service type, restaurant type or by a list of items currently on sale in the example shopping mall. It should be appreciated that the type of information displayed at kiosk 310 will be tailored to the particular laa.

Video monitor 314 displays a touch screen keypad 320. Keypad 320 is alternatively an off-screen set of buttons. A display area 322 is provided to show the user's E-address or smart phone number as it is being entered at keypad 320. If the user mistypes a digit, the user can press "Back" on keypad 320 to correct the error. When the user has correctly entered the user's E-address or number, the user selects "Enter" at keypad 320.

The laa map can optionally be a shared map as has been described herein For this, a display area 324 is provided to show a shared friend or family member's number as it is being entered at keypad 320. Again, if the user mistypes a digit, the user can press "Back" on keypad 320 to correct the error. When the user has correctly entered the shared user's number, the user selects "Enter" at keypad 320. The user can add as many friends and family members to the shared map as is desired via keypad and display area 324. Thus the laa map can be a single user map or a shared map, whichever is desired. The pricing structure illustrated on video monitor is an example structure.

A touch screen or hard key button 326 is provided to allow the user to selectively view the numbers already entered. The user can thereby double check the E-address list before finalizing the transaction if desired. Or, if the user forgets which numbers have been entered already, the user can press recall button 326. At any time prior to finalizing the transaction, the user can press a touch screen or hard key "Start Over" button 328 to erase any information entered and start over.

Once the user swipes the user's credit or debit card, the card is authorized, and if approved, video monitor 314 displays a confirmation screen to the user momentarily, after which the screen of FIG. 5 is redisplayed. Upon confirmation, server 12 of system 110 (FIG. 2) or of system 150 (FIG. 3) sends a map to the one or more user via any of the modes described herein. It is contemplated to allow the user to enter as many laa map requests as desired within a particular period of time, e.g., twenty-four hours. The current location of each user of a shared map is displayed on each map generated for the user. In an embodiment, the shared map is limited to allowing only the initial user to ask for a map to be generated. But the location of each shared user is displayed on the map. In an alternative embodiment, the shared map is configured to allow any user to switch back and forth from a (i) "view all users" mode in which a map wide enough to show all users is displayed to a (ii) "view my route" mode, which does not have to show all other users and instead shows that cdd user's desired route. The shared map can allow any user to selectively zoom-out and zoom-in to accomplish (i) and (ii), respectively.

Any of the shared display structure, functionality and alternatives discussed herein for the laa's can be implemented with kiosk 310 operating with system 110 and 150. For example, the meeting time and "time to leave" functions discussed above may be implemented with kiosk 310.

Sample Communication And Data Transfer Device Screens

Figure 6:
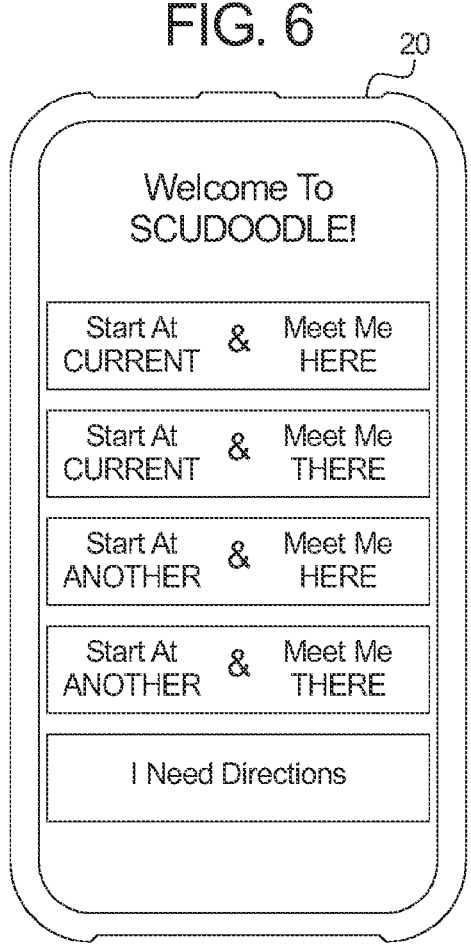
FIG. 6 is an elevation view of one embodiment of an initiation screen displayed on a user's communication and data transfer device ("cdd"), which provides different route options to the user.

Referring now to FIGS. 6 to 11, one embodiment for displaying the set-up portion of wider area application method 210 of FIG. 4 (FIGS. 4A to 4C) on sender's cdd 20 is illustrated. As shown in FIG. 6, when the sender launches the application, from software stored already on the sender's phone or from software downloaded from server 12 to sender's cdd 20 for this particular use of the application, the sender's cdd 20 can display a screen such as shown in FIG. 6. The initial screen at FIG. 6 prompts the sender to select the type of route to be generated. In the illustrated example, the sender can select any one of a touch screen or hard key: (i) "Start at Current & Meet Me Here" button, (ii) "Start at Current & Meet Me There" button, (iii) "Start at Another & Meet Me Here" button, (iv) "Start at Another & Meet Me There" button, or (v) "I Need directions" button. FIGS. 7 to 11 illustrate the next screen displayed after any one of (i) to (v) is selected, respectively.

Figure 7:
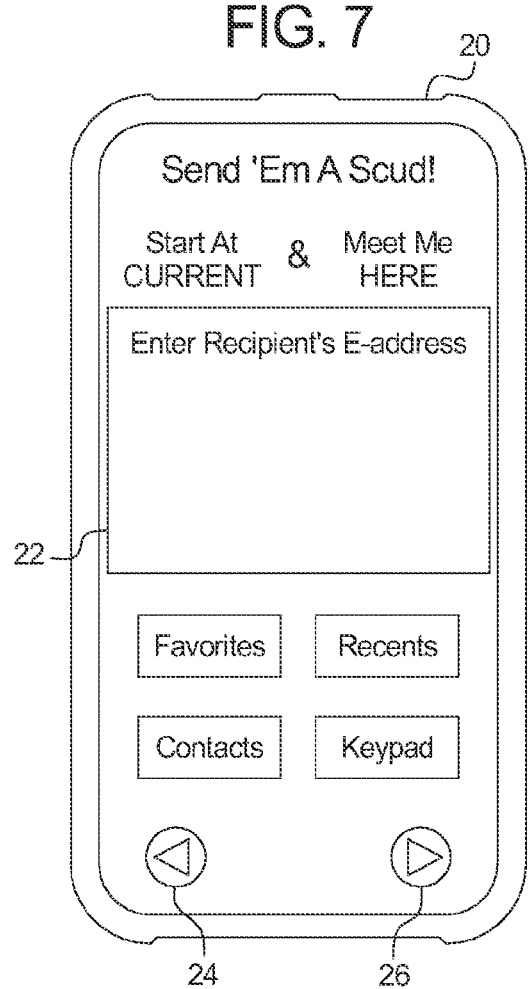
FIG. 7 is an elevation view of one embodiment of a "meet me here" screen displayed on a user's cdd.

FIG. 7 shows one example of a screen displayed on cdd 20 after the user selects the "Start at Current & Meet Me Here" button of FIG. 7. As described above with method 210, the "Start at Current & Meet Me Here" route does not require an address to be entered. The GPS or MTC locations of sender and receiver are used instead. Sender merely has to input the receiver's E-address (smart phone number or email address) in an embodiment. Cdd 20 includes a display area 22 into which the sender inputs recipient's E-address. The sender can recall recipient's E-address from one of various lists of E-addresses stored on sender's phone by pressing a touch screen or hard key "Favorites", "Recents" or "Contacts" button. The selected list is displayed in display area 22. The sender can scroll through the list and touch or otherwise select a name or tag from the list. Or, the sender can press a "Keypad" button to display a keypad to input the recipient's E-address digit by digit. A back button 24 allows the sender to undue an inputted digit or to back up to the screen of FIG. 7 after pressing one of the "Favorites", "Recents", "Contacts" or "Keypad" buttons.

An enter button 26 allows the sender to contact server 12 and to send a command to the server to formulate a "Start at Current & Meet Me Here" map and route using the GPS or MTC position of the sender as the ending location and the GPS or MTC position of the specified E-address as the starting location. Server 12 then sends the route to the recipient's cdd 30 and method 210 continues as described above.

FIG. 8 shows one example of a screen displayed on cdd 20 after the user selects the "Start at Current & Meet Me There" button of FIG. 7. As described above with method 210, the "Start at Current & Meet Me There" route requires sender to input a destination address. The GPS or MTC location of receiver is again used as the starting location. Sender again inputs the receiver's E-address (smart phone number or email address) in an embodiment into display area 22. The sender can again recall recipient's E-address from one of various lists of E-addresses stored on sender's phone by (i) pressing a touch screen or hard key "Favorites", "Recents" or "Contacts" button and scrolling through the list or (ii) using keypad 28. Display area 22 is bifurcated to receive the E-address above the midline and to receive the inputted destination below the midline. Sender can toggle back and forth between the upper and lower portions (e.g., by touching the portion) to selectively input and modify information. The sender uses the touch screen or hard key keypad 28 to input the desired destination address (e.g., via Options 1, 2 or 3 discussed above) below the midline. Back button 24 allows the sender to undue any inputted information or to back up to the screen of FIG. 8 after pressing one of the "Favorites", "Recents" or "Contacts" buttons.

Enter button 26 allows the sender to contact server 12 and to send a command to the server to formulate a "Start at Current & Meet Me There" map and route using the location entered by the sender as the ending location and the GPS or MTC position of the specified E-address as the starting location. Server 12 then sends the route to the recipient's cdd 30 and method 210 continues as described above.

FIG. 9 shows one example of a screen displayed on cdd 20 after the user selects the "Start at Another & Meet Me Here" button of FIG. 7. As described above with method 210, the "Start at Another & Meet Me Here" route requires the sender or recipient to input a starting address. The GPS or MTC location of sender is used as the destination location. Sender again inputs the receiver's E-address (smart phone number or email address) in an embodiment into display area 22. The sender can again recall recipient's E-address from one of various lists of E-addresses stored on sender's phone by (i) pressing a touch screen or hard key "Favorites", "Recents" or "Contacts" button and scrolling through the list or (ii) using keypad 28. Display area 22 is bifurcated to receive the E-address above the midline and to receive the inputted starting location below the midline. Sender can toggle back and forth between the upper and lower portions (e.g., by touching the portion) to selectively input and modify information. The sender uses the touch screen or hard key keypad 28 to input the desired starting location address (e.g., via Options 1, 2 or 3 discussed above) below the midline. Or, the sender can press a "HERE" button to instead allow the recipient to enter the starting location as has been described with method 210. Back button 24 allows the sender to undue any inputted information or to back up to the screen of FIG. 9 after pressing one of the "Favorites", "Recents" or "Contacts" buttons.

Enter button 26 allows the sender to contact server 12 and to send a command to the server to formulate a "Start at Another & Meet Me Here" map and route using the location entered by the sender as the starting location and the GPS or MTC position of the sender as the route destination. Or, server 12 uses the specified E-address to contact the recipient who instead enters the starting location. When server 12 obtains the starting location from either the sender or the receiver, and knowing that the GPS or MTC location of sender's cdd 20 is the destination address, server 12 generates and sends the route to the recipient's cdd 30 and method 210 continues as described above.

FIG. 10 shows one example of a screen displayed on cdd 20 after the user selects the "Start at Another & Meet Me There" button of FIG. 7. As described above with method 210, the "Start at Another & Meet Me There" route requires the sender or the recipient to input a starting address and the sender to input the destination address. The GPS or MTC location of neither the sender nor the receiver is used. Nevertheless, the sender again inputs the receiver's E-address (smart phone number or email address) in an embodiment into display area 22. The sender can again recall recipient's E-address from one of various lists of E-addresses stored on sender's phone by (i) pressing a touch screen or hard key "Favorites", "Recents" or "Contacts" button and scrolling through the list or (ii) using keypad 28. Display area 22 is divided here into three portions to receive the E-address at the top portion, the inputted destination in the middle portion, and the inputted starting location at the bottom portion. Sender can toggle back and forth between the upper, middle and lower portions (e.g., by touching the portion) to selectively input and modify information. The sender uses the touch screen or hard key keypad 28 to input the desired starting and ending location addresses (e.g., via Options 1, 2 or 3 discussed above) below the midline. Or, the sender can press a "HERE" button to instead allow the recipient to enter the starting location. Back button 24 allows the sender to undue any inputted information or to back up to the screen of FIG. 10 after pressing one of the "Favorites", "Recents" or "Contacts" buttons.

Enter button 26 allows the sender to contact server 12 and to send a command to the server to formulate a "Start at Another & Meet Me There" map and route using the locations entered by the sender as the starting and ending locations. Or, server 12 uses the specified E-address to contact the recipient who instead enters the starting location. When server 12 obtains the starting location from either the sender or the receiver, and knowing the entered destination address, server 12 sends the route to the recipient's cdd 30 and method 210 continues as described above. While a GPS or MTC is not needed to generate the route, it is still expressly contemplated to use the GPS or MTC of one or both of cellular services 40 and 60 to track the recipient's progress and to additionally track the sender's movement in certain implementations.

FIG. 11 shows one example of a screen displayed on cdd 20 after the user selects the "I Need Directions" button of FIG. 7. As described above with method 210, the "I need directions" route requires an address to be entered for the destination and optionally for a starting location. Or, the sender's cdd 20 GPS or MTC location can be used as the starting location. There is no recipient, so no recipient E-address is entered. "Favorites", "Recents" or "Contacts" are not displayed accordingly in one embodiment. Display area 22 is bifurcated to receive the entered destination above the midline and to receive the inputted starting location (if done this way) below the midline. Sender can toggle back and forth between the upper and lower portions (e.g., by touching the portion) to selectively input and modify information. The sender uses the touch screen or hard key keypad 28 to input the desired destination and starting addresses (e.g., via Options 1, 2 or 3 discussed above) above and below the midline, respectively. Or, the sender can press a "HERE" button to allow the sender's cdd 20 GPS or MTC location to be used instead as the starting location.

Back button 24 allows the sender to undue any inputted information. Enter button 26 allows the sender to initiate contact with server 12 and to send a command to the server to formulate an "I Need Directions" map and route using the location entered by the sender as the ending location and either (i) the entered starting location or (ii) sender's cdd 20 GPS or MTC position as the starting location. Server 12 then sends the route to sender's cdd 20 and method 210 continues as described above.

Further Alternative Embodiments

Server 12 and transmission/receive tower 52 in systems 10, 110 and 150 can alternatively operate with a dedicated GPS or MTC as opposed to using the GPS or MTC systems of the cellular providers. With laa 102 and any of the local application systems described herein, it is contemplated that a dedicated local positioning system ("LPS") is used instead of a GPS or MTC to track the movement of the user's cdd within the laa. The LPS can be mounted on a tower and be set within the laa as coordinate 0,0 of system 110 FIG. 2, for example, or as a reference point of the map of system 150 of FIG. 3. The LPS is alternatively placed adjacent to the laa. The laa application itself determines the position of each participating cdd within the laa, without the need for the GPS's or MTC's of the cellular services. Server 12 uses the locally obtained location of the user, updates the route and map accordingly, and sends the updated map via a data transfer to the user's cdd. It is contemplated to expand this methodology to the larger area systems as well.

In another alternative embodiment, a GPS, MTC or LPS is not used at all. One example of this has already been descried with the route generation portion of the "Start at Another & Meet Me There" variety. With the laa's, it is contemplated that the geographical location is small enough to be highly searchable. The cdd can download to the user's cdd, e.g., via kiosk 310, a screen with a simple "[blank] to [blank]?" query that the user answers by typing or selecting from one or more dropdown menu, e.g., [bear] and [ape] for a zoo, or [Demon] to [funnel cake] for an amusement part, or [Store A] to [Store B] for a shopping mall.

In still another alternative embodiment, while the systems have been described herein using the sender's and receiver's cdd's, it is contemplated to alternatively provide a separate device operable with server 12 and transmission/receive tower 50 and a dedicated GPS, MTC or LPS), such that cdd's 20 and 30, and their associated servers et al., are not needed. The device has processing, memory, software, one or more sound card and a video monitor, e.g., operable with a touch screen or hard keys for generating, viewing and/or listening to any of the routes and maps described herein. The device can receive software updates from time to time and be allowed to download laa maps as needed, e.g., for a fee. The maps can be shared by, and routes can be sent back and forth between, any two or more user's having their own device.

Content Changeable Smart Phone Application for Navigable Venues

Figure 12:
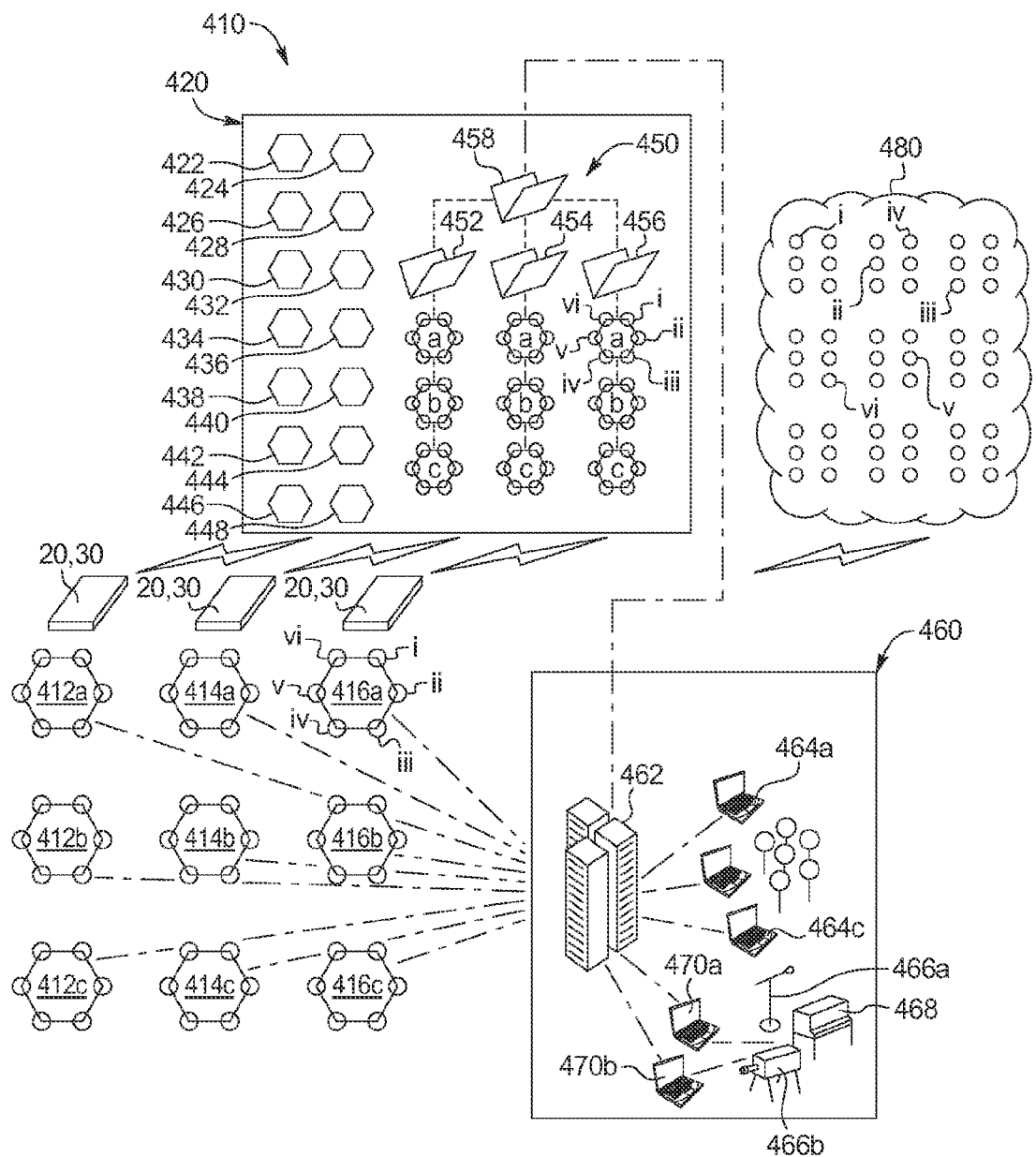
FIG. 12 is a schematic view of one embodiment of a content changeable smart phone application for navigable venue system of the present disclosure.

Referring now to FIG. 12, various embodiments for a content changeable smart phone application for navigable venues is illustrated by system 410. In once sense, system 410 may be termed an informational tour application that is played or performed on the user's or smart phone or communication and data transfer device ("cdd") 20, 30. System 410 allows a person entering a navigable venue, e.g., any of the local application areas 102 discussed above, to select an application specific to that venue. The venue could for example be a museum, zoo or shopping mall. The person upon entering the museum for example is notified that the museum application exists. The person can then choose to download the museum application to the person's smart phone or cdd, e.g., for a nominal fee. It is expressly contemplated that system 410 use any known format or platform for storing and downloading the museum or other venue application.

Once downloaded, the museum application provides the user in essence with an informational tour of the museum. The application likely has, but does not have to have, an audio component. For this, the user can plug headphones into the user's smart phone or cdd. The museum can be outfitted with headphones, e.g., simpler headphones as are found on an airplane, for sale or to give away. Or, the smart phone or cdd can send audio signals wirelessly, e.g., via Bluetooth or other local wireless technology, to an earpiece worn by the user.

System 410 also maps the venue, e.g., the museum. In an embodiment, delivery of the application content, e.g., audio content, is user selectable. That is, the user can approach and view any exhibit within the museum that the user wishes. The user then finds an icon for that exhibit on the map of the museum. As shown below, the user can zoom into and out of the map to easily find the desired exhibit icon. Once the user selects the icon, e.g., via the smart phone touch pad, the content for that exhibit is played. The content can include words and/or music that provide or correspond to an environment, mood or genre of the particular exhibit. The content can help to explain not only what the exhibit is or entails but also its significance, e.g., with respect to or in conjunction with, other exhibits in the museum.

It is expressly contemplated that system 410 provide a language selection option to the user when presenting the application for download to the user's cdd 20, 30. Thus, a person traveling in France can visit a museum and learn important facts, explained in English, about a particular exhibit, e.g., about an artist when viewing his or her artwork.

It is contemplated that system 410 automatically move the map to center the previously selected icon on the screen of the cdd 20, 30. The assumption is that the user is currently physically located at or near the previously selected icon. Adjacent icons are then prominently displayed on the screen for selection as the user walks away from the previously viewed exhibit. The screen is scrollable in one embodiment, so that the user can walk for awhile and then scroll the screen so that the screen scrolls to the user's current location. The user can thus pick and choose, on his or her schedule, which exhibit icons to press and to play. It is however contemplated at the end of an audio content to direct the user to an adjacent or related exhibit to provide an introduction for same. The user can then choose to view or not to view the newly introduced exhibit.

In an alternative embodiment, the application content can be "guided", wherein the application either directs the user where to begin, or allows the user to begin at the user's desired exhibit, after which the content guides the user from exhibit to exhibit. In a further alternative embodiment, the application upon downloading prompts the user to choose whether the content is to be provided in a user-selected format or to be provided in a guided format, e.g., does the user fly the plane or is the plane on auto-pilot. In yet another alternative embodiment, tours are provided in subsets, e.g., rooms, within an overall venue. For example, an art museum may have rooms dedicated to a certain artist, group of artists, or style of art. System 410 can structure the content within one or more subsets or rooms to be guided, after which the user is free to choose the next subset or room to view, which may or may not also be guided. Animal houses within a zoo could likewise be provided with guided content, but wherein the ser is allowed to choose the order in which the animal houses are attended.

As discussed, the application content can additionally or alternatively include video content. For example, when the user is at the zoo, approaches the lions den and selects the lion icon from the downloaded zoo application, a video or audiovisual output showing (and possibly commenting on) the lions at play, the older lion as a cub, or the lions at feeding time, for example, is played. The video can be an introductory video which stops, after which the main audio for the museum or zoo exhibit is played. It should be appreciated that the above examples are applicable to virtually any navigable, multi-icon yielding venue, such as botanical gardens, amusement parks, etc. It is expressly contemplated to structure each application to be consistent with the look or brand of the venue, so that the application appears to be part of the overall package and experience provided by the venue.

The museum and zoo examples are two examples of a venue that is an entity having multiple components, e.g., a zoo with multiple animal displays. It is also expressly contemplated for system 410 to provide an application for a plurality of entities forming an overall venue. One example is a shopping mall having a plurality of differently owned or leased stores or services. A goal of system 410 as applied to a shopping venue is again to provide information, although perhaps not in a tour format. A shopper at the mall may want to know about what brands the store carries, any sales that are currently occurring, or what season of clothing is currently being stocked, for example. Providing such information to a shopper residing just outside of the store can be a powerful tool. The shopping mall application can also have audio, video or audiovisual content. For example, the store content can include an audiovisual commercial for the store or for one or more brands carried within the store. Once inside the store, the store content can provide a map to different store locations and items.

As with kiosk 310 of FIG. 5, system 410, e.g., upon downloading the shopping mall application, e.g., as a home screen of the shopping mall application, can provide searching functionality, which enables the user to search for destinations, e.g., by store name, brand name, merchandise type, service type, restaurant type or by a list of items currently on sale in the example shopping mall. For example, the user can enter or select "Brand X" shoes, after which the application flips to a map of the mall highlighting each store carrying "Brand X" shoes.

In light of the above description of system 410, FIG. 12 illustrates one set of apparatuses for providing same. In FIG. 12, system 410 includes three primary components, namely a plurality of venues 412a to 416c, an application sandbox or storage area 420, and an application service provider 460. Venues 412a to 416c can be any of the venues of local application areas described herein. For purposes of illustration, and to be consistent with the above examples, venues 412a to 412c are three different museum venues. Venues 414a to 414c are three different zoo venues. Venues 416a to 416c are three different shopping mall venues. Obviously, system 410 can include more or less than three of any type of venue. And again, other types of venues can be employed within system 410.

Each venue includes a plurality of content receiving stations. The content receiving stations include the exhibits at the museums, the animal dens or cages at the zoos, and the different stores and service providers at the shopping malls. Each venue is illustrated having six content receiving stations (i) to (vi). Again, the venues can have more or less than six content receiving stations. Each content receiving station is selectable to play, and/or part of a tour that plays, an audio, visual or audiovisual output tailored to each specific content receiving station as has been described above.

Application sandbox 420 is or includes any known or future developed repository of application software that can be downloaded to a smart phone or cdd 20, 30. Application sandbox 420 is where users go to procure applications or apps. In the illustrated embodiment, application sandbox 420 includes applications 422 to 448, which represent any type of application written and provided by other programmers. Application 450, one of the applications stored in application sandbox or storage area 420, is provided by the developers of the present disclosure.

Application 450 in the illustrated embodiment includes a primary folder 458 that stores a plurality of secondary folders 452, 454, 456, etc. In once embodiment, each secondary folder corresponds to and stores applications falling under one of the types of venue categories discussed above. Again, for purposes of illustration, and to be consistent with the above examples, folder 452 stores museum applications, folder 454 stores zoo applications, while folder 456 stores shopping mall applications. In the illustrated embodiment, museum applications 452a to 452c correspond respectively to museum venues 412a to 412c. Zoo applications 454a to 454c correspond respectively to zoo venues 414a to 414c. Shopping mall applications 456a to 456c correspond respectively to shopping mall venues 416a to 416c. Again, system 410 can include more or less than three of any type of application software. And again, other types of venue applications can be employed within system 410.

Consistent with the example, each application 452a to 456c is provided with six pieces (i to vi) of audio, visual or audiovisual content, examples of which have been described above. Again, six pieces of content are used merely for example. Different venues and corresponding software applications can have differing numbers of content stations and corresponding content, and which can be more or less than six. Each application 452a to 456c is also provided with an interactive map of the corresponding venue 412a to 416c.

In one embodiment, the maps and the contents (i to vi) of each application 452a to 456c are stored in application sandbox 420. When inside the application, the user selects one of the cloud stations (i to vi) shown on the map of application 452a to 456c, after which the corresponding content (i to vi) of the application is launched on the user's smart phone or cdd 20, 30. In this implementation, once the user's smart phone or cdd 20, 30 receives the application 452a to 456c, the user's smart phone or cdd 20, 30 no longer requires outside data transfer, the application is self-contained.

In an alternative embodiment, the map of each application 452a to 456c is stored in application sandbox 420, while the contents (i to vi) of each application 452a to 456c are stored in a cloud server 480. In this latter embodiment, when an application 452a to 456c is launched, the user's smart phone or cdd 20, 30 is placed in data flow communication with cloud 480. When inside the application, the user selects one of the content stations (i to vi) shown on the map of application 452a to 456c, after which the corresponding content (i to vi) associated with application 452a to 456c is launched inside cloud 480 and output data from the launched content is streamed back to the user's smart phone or cdd 20, 30. In this implementation, the user's smart phone or cdd 20, 30 does not have to actually store the application contents, just the map and the streamed output data.

Application service provider 460 includes one or more computer server 462. Computer server 462 maintains a data communication link (wired and/or wireless) with each venue 412a to 416c. As illustrated, computer server 462 also maintains a data communication link (wired and/or wireless) with software application 450 located in application sandbox 420. Application service provider 460 employs a plurality of application design, preparation maintenance and content update personnel, who communicate with server 462 and thus venues 412a to 416c and software application 450 via their personal computers 464a, 464b, 464c, etc., at which the applications are designed, prepared and updated. Application service provider 460 also contains or employs sound recording equipment 466a, video recording equipment 466b and sound generating equipment 468, such as musical instruments and/or electronically stored sound bites, music, and other audio. Audio, video or audiovisual files created using sound recording equipment 466a, video recording equipment 466b and sound generating equipment 468 are stored in personal computers 470a, 470b, etc., which likewise communicate with server 462 and thus with application design, maintenance and content update personnel computers 464a, 464b, 464c, etc.

Only the venues 412a to 416c can know when their respective application 452a to 456c needs to be updated. It is contemplated for computer server 462 to prompt the venues 412a to 416c at regular intervals for updates. But ultimately, the venues need to inform application service provider 460 via computer server 462 of when and how a particular content server is going to change or need updating. The venue 412a to 416c may inform computer server 462 that a particular content station (i to vi) needs updating and send its own content to use for the update. For example, a shopping mall venue 416a to 416c may send its own audiovisual commercial for a particular store (i to vi) to server 462. Application design, maintenance and content update personnel via computers 464a, 464b, 464c, will then upload the new audiovisual commercial via server 462 to the appropriate shopping mall application 456a to 456c and content address (i to vi), writing over the old content in the process. In another example, museum venue 412a to 412c may send its own audio file for a particular exhibit (i to vi) to server 462. Application design, maintenance and content update personnel via computers 464a, 464b, 464c, will then upload the new audio file via server 462 to the appropriate museum application 452a to 452c and content address (i to vi), writing over the old content in the process. If easier to do, the entire application with the new file can be sent instead to rewrite over the old application.

Venues 412a to 416c may alternatively rely on application service provider 460 to create the content file. Venues 412a to 416c for example, may only send the written copy or verbiage to server 462 and rely on application design, maintenance and content update personnel to work with recording equipment 466a, video recording equipment 466b and/or sound generating equipment 468 to create the actual content file based on the copy or verbiage. To this end, professional readers and/or actors may be employed to perform the copy. The resulting content file is sent from personal computers 470a, 470b via server 462 to application design, maintenance and content update personnel computers 464a, 464b, 464c, which can forward the file back to the requesting venues 412a to 416c for approval. Once approved, the application design, maintenance and content update personnel via computers 464a, 464b, 464c, will then upload the new audio, video or audiovisual file via server 462 to the appropriate museum application 452a to 452c and content address (i to vi), writing over the old content in the process. Again, if easier to do, the entire application with the new file can be sent instead to rewrite over the old application.

Venues 412a to 416c may further alternatively rely on application service provider 460 to create the copy or skit and the content file. To this end, professional writers, readers and/or actors may be employed to create and perform the copy. The resulting content file is uploaded as has been described. Each of the three levels of venue participation regarding a change in content (i to vi) for a content address (i to vi) is equally applicable to a change in the map for the application 452a to 452c. A change in the map may for example result in the elimination of one or more old content address (i to vi) and/or the addition of one or more new content address (vii to . . . ) needing new content (vii to . . . ).

System 410 further illustrates that the user's smart phone or cdd 20, 30 communicates wirelessly with sandbox or storage area 420 and/or cloud 480. It is contemplated that system 410 enables the user to use a downloaded application 452a to 456c as many times as desired. In the embodiment in which cloud 480 is not used, and the user returns to the same venue, e.g., to the same shopping mall 416a to 416c, the user can select to have the same application 456a to 456c downloaded again. Once the new application 456a to 456c realizes it needs to write over and older version of the shopping mall, the new application 456a to 456c can make a determination of what percentage of the application has changed from the old version to the new version. The percentage is displayed to the user, who can then decide whether to complete the download of the new application, e.g., with an accompanying fee or to abort the download and use the old application.

In the case in which cloud 480 is used, it is contemplated for system 410 to make it a term or condition that the user accepts that the downloaded application 456a to 456c be usable for a certain period of time, e.g., thirty days. Here, the user can reuse the application and reap the benefit of any new content provided within the time period. After the time period, however, the particular application 456a to 456c will need to be repurchased.

Referring now to FIGS. 13 to 16, example smart phone or cdd 20, 30 screens for system 410 are illustrated. When the user proceeds to the store for application sandbox 420 on the user's smart phone or cdd 20, the user will find an icon representing application 450. When selected, application 450 presents primary file 458 to the user. From primary file 458, the user selects a venue type file 452, 454, 456, etc. From the venue type file, the user selects the application 452a to 456c for the particular venue 412a to 416a that the user seeks content. Once the application is selected, a term/acceptance screen appears. Once the user agrees to the terms, application 452a to 456c is downloaded from application sandbox 420 to the user's cdd 20, 30.

Figure 13:
FIG. 13 is an elevation view of one embodiment of a "home" screen displayed on a user's cdd for the system of FIG. 12.

FIG. 13 illustrates one example Home Screen for a shopping mall application 456a to 456c corresponding to a particular shopping mall venue 416a to 416c. In an embodiment, the Home Screen of FIG. 13 is displayed automatically when the shopping mall application 456a to 456c is launched. In the illustrated embodiment, the Home Screen displays a welcome message, e.g., "Welcome To Red Arrow Mall". In this manner, the shopping mall application 456a to 456c becomes part of the mall. Within the Home Screen, the user can ask for information concerning either one or both of the shopping mall application 456a to 456c and/or the shopping mall itself.

The Home Screen also enables the user to exit the application. The user can enter, exit and reenter the application as many times as desired, at the very least for that day at the mall. As discussed above, it is contemplated to make the application 456a to 456c (until written over) or useable for an agreed-upon number of days.

The Home Screen of FIG. 13 enables the user to search for desired items, such as brands, sales, stores, services, etc. The searching enables to use to locate desirable stores before listening to any of the application's content. For example, the user may be looking for Brand X shoes. The search engine via the Home Screen will highlight all stores. In an embodiment, the highlighting is performed on the Site Map Screen. The Site Map Screen and a map Orient Screen (discussed below) are both accessible from the Home Screen.

Figure 14:
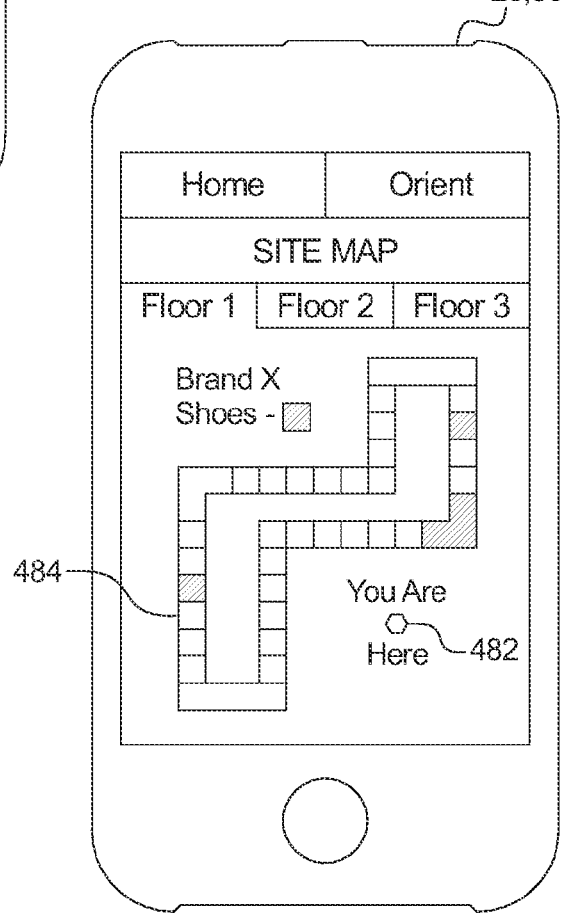
FIG. 14 is an elevation view of one embodiment of a "site map" screen displayed on a user's cdd for the system of FIG. 12.

FIG. 14 illustrates the Site Map Screen accessed from the Home Screen of FIG. 13. Continuing the example, the Site Map Screen highlights stores containing Brand X shoes. In the illustrated example, there are three stores on the first floor that carry Brand X shoes. The user can select Floor 2 and Floor 3 to canvass the entire mall. In an embodiment, desired areas of the Site Map Screen can be enlarged via the touch screen of cdd 20, 30 as is known in the art. The user can enlarge the Site Map Screen so as to make any of the Brand X shoe-carrying stores selectable. Once selected, the user can listen to and/or view that store's content. Thus the user does not have to be at the particular store to hear its content. Indeed, the user does not even have to be at the venue to hear the contents of the applications of the present disclosure. The user can be at home or elsewhere and preview the contents of any of the applications, including any application type, discussed herein.

The Site Map Screen also includes a "you are here" feature. In an embodiment, the "you are here" icon 482 (shown in FIG. 16 as a hexagon) is placed in the map 484 of the Site Map Screen only after the user orients himself or herself. Once orienting is completed, as illustrated in FIG. 15, the user can shift back to the Site Map Screen and see the "you are here" icon 482 placed appropriately in map 484 of the Site Map Screen. The Site Map Screen also includes a "you are here" feature. In an embodiment, the "you are here" icon 482 (shown in FIG. 16 as a hexagon) is placed in the map 484 of the Site Map Screen. only after the user orients himself or herself. Once orienting is completed, as illustrated ion FIG.15, the user can shift back to the Site Map Screen and see the "you are here" icon 482 placed appropriately in map 484 of the Site Map Screen.

Referring now to FIG. 15, an embodiment of a map Orient Screen is illustrated. Orient Screen as illustrated can be accessed from the screens of FIGS. 13, 14 and 16. The Orient Screen centers map 484 on the user's current location in the proper orientation based upon the user's current direction of travel. The Orient Screen asks the user to select a store to the left or right of the user in the user's current direction of travel. Scrollable boxes 486a and 486b listing each of the stores of shopping mall venue 412a to 416a are placed to the left and right, respectively of a travel direction arrow 488. Direction arrow 488 is used in conjunction with a scrolling feature that allows each of the stores to be viewed and selected within boxes 486a and 486b. Assume, for example, that the user scrolls to and selects Store C from left side box 486a. A Content Selection Screen of FIG. 16 then appears.

Referring now to FIG. 16, the selection of Store C from left side box 486a causes map 484 to enlarge and shift to the position illustrated. Store C is centered to the left of direction of travel arrow 488. If the user shifts back to the Site Map Screen of FIG. 14, icon 482 will now be shown on map 484 next to Store C. In the illustrated embodiment, Store C continues to be highlighted from the Brand X shoes search formed from the Home Screen of FIG. 13.

Each store icon 490a to 490e in FIG. 16 having content can be selected to hear and/or view the respective content. Store icons 490a to 490e not having content may be grayed out. Selecting any icon 490a to 490e within FIG. 16 for its content may or may not cause the selected icon to become the centered map 484 icon in the Content Selection Screen of FIG. 16. In either case, as the user walks from store to store, the user can scroll at the direction of travel arrow 488 to translate the store icons 490a to 490e up or down to maintain the store icon corresponding to the store at which the user is currently adjacent centered roughly within FIG. 16.

The user can reorient himself of herself at anytime, e.g., after changing direction, changing elevations or floors. The content of each store icon 490a to 490e can be played and replayed as many times as desired.

Substituting museum exhibits or zoo attractions for the stores in the above examples, it should be appreciated that the screens of FIGS. 13 to 20 can be used for any of the types of venues discussed herein. Each type of venue will be customized, e.g., adding tours to museums and zoos, customizing searchable subject matter. However, the overriding principle of providing updatable content to enhance the experience at each of the venues is a constant.

Additional Aspects of the Present Disclosure

Aspects of the subject matter described herein may be useful alone or in combination one or more other aspect described herein. Without limiting the foregoing description, each of the structures and methodologies associated with each of the below listed claims may be used in combination with structures and methodologies associated with any other claim or any combination of other claims. Further, each of the structures and methodologies associated with each of the drawings and associated written description of the present application may be used in combination with structures and methodologies associated with any other drawing and associated written description or any combination of other drawings and associated written description.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A content changeable system for navigable venues comprising:
   a computer memory specifically modified to store a plurality of software applications, each software application individually downloadable to a user's communication and data transfer device ("cdd"), each software application corresponding to a venue that can be physically navigated by the user, each application including a plurality of selectable icons corresponding to different content stations within the venue and at least one changeable content corresponding to one of the content stations of the venue, the changeable content selectively playable via a user's selection of the corresponding icon;

equipment for creating or changing the changeable content;

at least one computer server specifically programmed to:
(i) upload the software applications to the software application storage memory; and
(ii) receive information from at least one of the venues indicating that a particular changeable content corresponding to a particular content station of the at least one venue needs to be changed; and at least one computer in data communication with the computer server, the at least one computer specifically modified to accept changed content from the equipment.

2. The content changeable system of claim 1, wherein the plurality of software applications are stored in a primary folder and which includes a plurality of secondary folders, each secondary folder dividing the applications into venues of a common type.

3. The content changeable system of claim 2, wherein each of the plurality of software applications is user selectable for downloading from one of the plurality of secondary folders, and wherein each secondary folder is user selectable from the software application storage memory.

4. The content changeable system of claim 1, wherein each application includes a map spatially relating the selectable icons, and wherein the map and the at least one changeable content are stored at the application storage memory.

5. The content changeable system of claim 1, wherein each application includes a map spatially relating the selectable icons, and wherein the at least one changeable content is stored at a separate cloud server.

6. The content changeable system of claim 5, wherein the map is stored at the application storage memory.

7. The content changeable system of claim 1, wherein each application includes a map spatially relating the selectable icons, and wherein the map is configured to orient the user at the corresponding venue.

8. The content changeable system of claim 1, wherein each application includes a map spatially relating the selectable icons, the map highlighting one of the selectable icons after a user selection of the highlighted icon from a list of the icons.

9. The content changeable system of claim 1, wherein being configured to upload the software applications to the software application storage memory includes being configured to upload the software applications an initial time and to reload the software applications.

10. The content changeable system of claim 9, wherein being configured to reload the software applications includes being configured to update, add or subtract at least one content associated with at least one of the software applications.

11. The content changeable system of claim 1, wherein the changeable content includes an audio, visual or audiovisual file.

12. The content changeable system of claim 1, wherein being configured to receive information from at least one of the venues indicating that a particular changeable content corresponding to a particular content station of the at least one venue needs to be changed includes being configured to receive a content file from the at least one venue.

13. The content changeable system of claim 1, wherein being configured to receive information from at least one of the venues indicating that a particular changeable content corresponding to a particular content station of the at least one venue needs to be changed includes being configured to receive a request to produce a content file based on verbiage provided by the at least one venue.

14. The content changeable system of claim 1, wherein being configured to receive information from at least one of the venues indicating that a particular changeable content corresponding to a particular content station of the at least one venue needs to be changed includes being configured to receive a request to produce verbiage and an associated content file from the at least one venue.

15. The content changeable system of claim 1, wherein the server is part of an application service provider, which includes apparatus in communication with the server for at least one of (i) creating the applications, or (ii) changing the changeable content.

16. The content changeable system of claim 1, wherein the software applications are configured such that the changeable content can be performed on the user's cdd even if the user is not at the corresponding venue.

17. The content changeable system of claim 1, wherein each of the plurality of software applications is user selectable for downloading from the software application storage memory.

18. The content changeable system of claim 1, wherein the equipment for creating or changing the changeable content includes at least one of recording equipment or sound generating equipment.

19. A method for changing a downloadable software application comprising:
specifically modifying a computer memory to store a plurality of software applications downloadable to a user's communication and data transfer device ("cdd"), each software application corresponding to a venue that can be physically navigated by the user, each application including a plurality of selectable icons corresponding to different content stations within the venue and at least one changeable content corresponding to one of the content stations of the venue, the changeable content selectively playable via a user's selection of the corresponding icon;
specifically programming at least one computer server to receive information from at least one of the venues indicating that a particular changeable content corresponding to a particular content station of the at least one venue needs to be changed;
placing at least one computer in data communication with the at least one computer server, and specifically modifying the at least one computer to accept changed content from the equipment; and
having the content changed accordingly using equipment for changing the changeable content.

20. The method of claim 19, wherein changing the content includes recording new content.

21. The method of claim 19, wherein changing the content includes creating new content.

22. The content changeable system of claim 19, wherein the equipment for changing the changeable content includes at least one of recording equipment or sound generating equipment.

* * * * *